US005914738A

United States Patent [19]

Izumi

[11] Patent Number: 5,914,738

[45] Date of Patent: Jun. 22, 1999

[54] IMAGE FORMING APPARATUS

[75] Inventor: Hideshi Izumi, Ikoma, Japan

[73] Assignee: Sharp Kabushiki Kaisha, Osaka, Japan

[21] Appl. No.: 08/807,037

[22] Filed: Feb. 26, 1997

[30] Foreign Application Priority Data

Mar. 6, 1996 [JP] Japan .................................... 8-49312

[51] Int. Cl.[6] ............................. B41J 2/06; B41J 2/385; G01D 15/06

[52] U.S. Cl. .......................... 347/55; 347/140; 399/261; 399/53

[58] Field of Search ..................... 347/55, 140; 399/261, 399/53

[56] References Cited

U.S. PATENT DOCUMENTS

| | | | |
|---|---|---|---|
| 5,097,277 | 3/1992 | Schmidlin et al. | 347/55 |
| 5,712,670 | 1/1998 | Kagayama | 347/55 |
| 5,790,153 | 8/1998 | Takagi | 347/55 |

FOREIGN PATENT DOCUMENTS

| | | | |
|---|---|---|---|
| 358155983 | 9/1983 | Japan | 347/55 |
| 4168064 | 6/1992 | Japan . | |
| 4358856 | 12/1992 | Japan . | |
| 6155798 | 6/1994 | Japan . | |

*Primary Examiner*—N. Le
*Assistant Examiner*—Lamson D. Nguyen
*Attorney, Agent, or Firm*—Dike, Bronstein, Roberts & Cushman, LLP; David G. Conlin

[57] ABSTRACT

A convex-concave member with a plurality of protruding portions is provided on the inner surface of a toner holding body. A hitting member for hitting the protruding portions with rotation of the toner holding body is provided inside the toner holding body. As the toner holding body rotates, the hitting member hits an adjacent protruding portion on the upstream side of the protruding portion with which the hitting member have been in contact with respect to the rotation direction of the toner holding body. This vibrates the surface of the toner holding body, and weakens adhesive forces of the toner to the toner holding body. If the hitting member is disposed so as to hit the protruding portion opposing an opposite electrode, the adhesive forces of the toner are weakened only in a toner projection area, while an enough toner transport amount is ensured outside the toner projection area. Therefore, it is possible to achieve the weakening of the adhesive forces of the toner by vibrating the surface of the toner holding body with a relatively simple configuration, and to make attempts to reduce the size and costs of the image forming apparatus.

22 Claims, 13 Drawing Sheets

(b)

(a)

IMAGE FORMING APPARATUS

FIELD OF THE INVENTION

The present invention relates to an image forming apparatus used as a copying machine, a printer and the like for forming an image with toner as image visualizing particles.

BACKGROUND OF THE INVENTION

In recent years, various image forming apparatuses are suggested for forming a visual image on a recording medium, such as paper, in accordance with image signals. For example, Japanese Laid-Open Patent Application No. 6-155798/1994 (Tokukaihei 6-155798) discloses an image forming apparatus for directly forming a toner image on a recording medium with toner as image visualizing particles that is projected so as to travel through a space and adhere to the recording medium. Referring to FIG. 12, the following description will explain such a conventional image forming apparatus.

The conventional image forming apparatus, as shown in FIG. 12, includes an image forming section 101 composed of a toner supply section 102 and a print section 103. The image forming apparatus projects toner 201 at a sheet of paper 105 as a recording medium in a controlled manner in accordance with image signals, so that the toner 201 adheres to the sheet of paper 105. An image is directly formed on the sheet of paper 105 in this manner.

The toner supply section 102 is composed of a toner storage box 200 for storing the negatively charged toner 201 and a toner holding body 202 for holding the toner 201. The toner holding body 202 is grounded and rotates in the direction indicated by the arrow E in FIG. 12 at a rotation speed of 30 mm/sec, measured on the surface of the toner holding body 202. The toner 201 is a single component toner, and the particle diameter is 10 $\mu$m in average. The toner 201 is charged to a charge value of −8 $\mu$C/g to −10 C/g with a well-known technique. The toner 201 is held on the toner holding body 202 so as to form a layer of 80 $\mu$m in average thickness on the outer peripheral surface thereof.

The print section 103 of the image forming apparatus 101 includes an opposite electrode 205 made of an aluminum pipe of 50 mm in diameter and a control electrode 206 disposed between the opposite electrode 205 and the toner holding body 202. The opposite electrode 205 is provided to be separated from the outer peripheral surface of the toner holding body 202 by a distance of 1 mm. The opposite electrode 205, supplied with a high voltage of about 2 kV by a D.C. power source section 210, rotates in the direction indicated by the arrow F in FIG. 12 at a rotation speed of 30 mm/sec, measured on the surface of the opposite electrode 205. In other words, an electric field necessary for projecting the toner 201 held on the toner holding body 202 towards the opposite electrode 205 is formed between the opposite electrode 205 and the toner holding body 202.

The control electrode 206 extends in two dimensions and opposes parallel to a tangential plane on the surface of the opposite electrode 205. The control electrode 206 has a structure through which the projected toner 201 can pass and travel from the toner holding body 202 towards the opposite electrode 205. The projection of the toner 201 from the toner holding body 202 towards the opposite electrode 205 is controlled by changing the potential applied to the control electrode 206 that, in turn, changes the electric field generated between the toner holding body 202 and the opposite electrode 205.

The control electrode 206 is disposed to be separated from the outer peripheral surface of the toner holding body 202 by a distance of 100 $\mu$m. The control electrode 206 is composed of a 50 $\mu$m thick flexible print circuit (FPC) **206*a* and ring-shaped electrodes 207 made of a 20 $\mu$m thick copper foils. The substrate 206*a* is provided with gates 209 of 150 $\mu$m in diameter through which the toner 201 passes. The ring-shaped electrode 207 is provided so as to encircle the gate 209. Each of the ring-shaped electrodes 207 is electrically connected to a control power source section 211** via a power supply wire (not shown) and a high voltage driver (not shown).

A voltage is applied to the ring-shaped electrodes 207 by the control power source section 211 in accordance with an image signal. That is, when the toner 201 held on the toner holding body 202 is to pass towards the opposite electrode 205, the control power source section 211 applies a voltage of 200 V to the ring-shaped electrodes 207 for 300 $\mu$sec. Meanwhile, the toner 201 moves from the toner holding body 202 to the opposite electrode 205 in 250 $\mu$sec. Therefore, the voltage is applied for a long enough time for the toner 201 to travel from the toner holding body 202 to the opposite electrode 205.

On the other hand, when the toner 201 held on the toner holding body 202 is not to pass towards the opposite electrode 205, the control power source section 211 applies a voltage of −200 V to the ring-shaped electrodes 207. A potential applied to the control electrode 206 is controlled in accordance with an image signal in this manner. Then as the sheet of paper 105 is placed on the side of the opposite electrode 205 opposing the toner holding body 202, a toner image is directly formed on the surface of the sheet of paper 105 in accordance with the image signal.

A single trigger circuit (not shown) almost simultaneously applies a voltage for rotating the toner holding body 202 and the opposite electrode 205, a voltage to the control electrode 206 so as to prevent the toner 201 from passing, and a high voltage to the opposite electrode 205.

Incidentally, in the image forming apparatus described so far, the toner 201 is pulled away from the toner holding body 202 with a force generated by an electric field and projected towards the opposite electrode 205. Since forces such as an image force, a van der Waals force and a liquid bridge force are applied to the toner 201 and the surface of the toner holding body 202, the toner 201 adheres to the toner holding body 202 with adhesive forces of certain strength. Therefore, in the image forming apparatus described so far, a strong electric field is needed for projecting the toner 201 against the adhesive forces.

For this purpose, for example, Japanese Laid-Open Patent Application No. 4-358856/1992 (Tokukaihei 4-358856) discloses a configuration which weakens the adhesive forces of the toner and thereby needs a weaker electric field for projection of the toner. A toner holding body 302 disclosed in this laid-open patent application has a structure in which, as shown in FIG. 13, a piezoelectric member 304 coats the surface of a metal roller core 303. The metal roller core 303 is connected to a vibration power source 307. The vibration power source 307 can apply a vibration voltage to the metal roller core 303 and a reference electrode layer 306 disposed on the side of an aperture electrode 305 facing the toner holding body 302, thereby generating a vibration electric field therebetween.

With the configuration, as a toner supply roller 308 rotates, the toner 301 in a toner box 300 adheres to and is held on the toner holding body 302. Thereafter, the toner holding body 302 rotates and transports the toner 301 to a neighborhood of an aperture **305*a*** of the aperture electrode

305. Here, the piezoelectric member 304 provided between the metal roller core 303 and the reference electrode layer 306 elongates and shortens with application of the vibration voltage by the vibration power source 307. As a result, the surface of the toner holding body 302 vibrates, stirring the toner 301 adhering to the toner holding body 302 and considerably weakening the adhesive forces of the toner 301 to the toner holding body 302. In this manner, the laid-open patent application weakens the adhesive forces of the toner 301 and thereby reducing the voltage necessary for projecting the toner 301.

Meanwhile, another example is disclosed by Japanese Laid-Open Patent Application No. 4-168064/1992 (Tokukaihei 4-168064), in which a vibration plate 403 is connected to a piezoelectric vibrator 402 and disposed on the back side of a toner transport belt 401 (a belt-shaped toner holding body) as shown in FIG. 14. A cam roller (not shown) may be used instead of the piezoelectric vibrator 402. In this laid-open patent application, vibration of the piezoelectric vibrator 402 (or rotation of the cam roller) vibrates the vibration plate 403, which in turn vibrates the toner transport belt 401. As a result, the adhesive forces of the toner (not shown) adhering onto the toner transport belt 401 are weakened.

Nevertheless, with the configurations disclosed by Japanese Laid-Open Patent Applications No. 4-358856/1992 and No. 4-168064/1992, the piezoelectric member 304, the piezoelectric vibrator 402, the cam roller, etc. are used to vibrate the toner holding body 302 and the surface of the toner transport belt 401. Therefore, such conventional configurations need to employ a special arrangement, such as a drive circuit and mechanism, a power supply, and a vibration electric field, only for the purpose of driving the piezoelectric member 304, the piezoelectric vibrator 402, the cam roller, etc. This leads to higher costs of the apparatuses. In addition, the special arrangement adds complexity to the apparatuses and hampers efforts to reduce the size of the apparatuses.

SUMMARY OF THE INVENTION

An object of the present invention is to offer an image forming apparatus for forming an image by vibrating the surface of the toner holding body with a relatively simple configuration, without the above described special circuit, power supply, etc., and to offer an image forming apparatus with which attempts can be made to reduce the size and the cost.

In order to accomplish the objects, the image forming apparatus in accordance with the present invention, has:

a holding body for holding image visualizing particles;

an opposite electrode disposed so as to oppose the holding body; and a control electrode for controlling projection of the image visualizing particles from the holding body towards the opposite electrode by varying an electric field generated between the holding body and the opposite electrode with a potential supplied to the control electrode in accordance with an image signal, wherein the holding body includes a plurality of protruding portions formed on an inner surface thereof, and also includes inside thereof a hitting member for hitting the protruding portions with rotation of the holding body.

With the configuration, the projection of the image visualizing particles on the holding body towards the opposite electrode is controlled according to a voltage applied to the control electrode. By controlling the projection of the image visualizing particles according to an image signal in this manner, a desired image is formed on a recording medium such as a sheet of paper.

Here, the protruding portions disposed inside the holding body rotate with rotation of the holding body and are hit by the hitting member. The hit vibrates the surface of the holding body and shake the image visualizing particles on the holding body. As a result, adhesive forces of the image visualizing particles to the holding body surely decrease. Therefore, the image visualizing particles are projected towards the opposite electrode even with a low projection electric field, and a desired image is formed on the recording medium.

Consequently, with such a relatively simple configuration in which the protruding portions and the hitting member are provided inside the holding body, it is possible to vibrate the surface of the holding body and it is not necessary to use a piezoelectric vibrator, a cam roller, etc. that have been conventionally used. Besides, since a piezoelectric vibrator, a cam roller, etc. are not used, it is neither necessary to provide a high voltage power source, a special circuit, etc. for driving them. Therefore, with the configuration, it is possible to simplify the configuration of a conventional apparatus. In addition, it is possible for these reasons to make attempts to reduce the size and costs of the apparatus.

In addition, preferably, if the hitting member is disposed so as to hit the protruding portion almost opposing the opposite electrode, the following effects are produced.

That is, the strongest vibration occurs only on the surface of the holding body corresponding to an image visualizing particle projection area, and the adhesive forces considerably weaken only for the image visualizing particles adhering to that image visualizing particle projection area.

Here, the adhesive forces of the image visualizing particles need to be weakened in the image visualizing particle projection area, because the image visualizing particles require adhesive forces of some strength outside the image visualizing particle projection area in order to be transported to the image visualizing particle projection area.

With the configuration, since it is possible to selectively vibrate the surface of the holding body in the image visualizing particle projection area, the strongest vibration occurs on the surface of the holding body in the image visualizing particle projection area, and the adhesive forces of the image visualizing particles to the surface of the holding body are satisfactorily ensured outside the image visualizing particle projection area. Consequently, it is possible to project only the image visualizing particles in the image visualizing particles projection area with a low voltage, and to satisfactorily ensure a transportation amount of the image visualizing particles transported to the image visualizing particles projection area. Therefore, it is possible to make attempts both to reduce the projection voltage of the image visualizing particles and to stably transport the image visualizing particles, which makes it possible to always form high quality images in a stable manner.

In order to accomplish the objects, the image forming apparatus in accordance with the present invention, has:

a holding body for holding magnetic image visualizing particles;

an opposite electrode disposed so as to oppose the holding body; and a control electrode for controlling projection of the image visualizing particles from the holding body towards the opposite electrode by varying an electric field generated between the holding body and the opposite electrode with a potential supplied to the control electrode in accordance with an image signal, wherein the holding body includes a rotatable magnetic roller and a rotatable sleeve, the magnetic roller having on a surface thereof a first protruding portion, and the sleeve having on an inner surface thereof a second protruding portion for being hit by the first protruding portion with rotation of the sleeve.

With the configuration, the magnetic image visualizing particles are held on the outer surface of the sleeve by a magnetic force from the magnetic roller disposed inside the holding body. Here, as the sleeve rotates, the first protruding portion provided on the surface of the magnetic roller hits the second protruding portion provided on the inner surface of the sleeve. This vibrates the surface of the sleeve, and shakes the image visualizing particles adhering to the surface of the sleeve. As a result, the adhesive forces of the image visualizing particles to the holding body surely weakens.

Therefore, with the configuration, the hit of the second protruding portion by the first protruding portion vibrates the surface of the sleeve, and weakens the adhering forces of the magnetic image visualizing particles to the holding body. Consequently, even when the magnetic image visualizing particles are used, it is possible to project the image visualizing particles with a low voltage.

Moreover, a conventional configuration in which only the magnetic roller is vibrated, and the vibration is transmitted to the sleeve generates some loss in the transmission process and is inefficient. However, with the configuration described above, since the first protruding portion directly hits the second protruding portion, the vibration is directly transmitted, and the loss in the transmission is greatly and surely reduced. As a result, the vibration of the magnetic roller is transmitted very efficiently to the image visualizing particles on the outer surface of the sleeve.

Furthermore, with the configuration, since the image visualizing particles are projected with a low voltage, it is not necessary to use a piezoelectric vibrator, a cam roller, etc. that have been conventionally used to vibrate the surface of the holding body. It is neither necessary to provide a high voltage power source, a special circuit, etc. for driving them. Therefore, with the configuration, even when the magnetic image visualizing particles are used, it is possible to simplify the configuration of a conventional apparatus, and to make attempts to reduce the size and costs of the apparatus.

For a fuller understanding of the nature and advantages of the invention, reference should be made to the ensuing detailed description taken in conjunction with the accompanying drawings.

DESCRIPTION OF THE EMBODIMENTS

First Embodiment

Referring to FIGS. 1 through 5, the following description will discuss an embodiment in accordance with the present invention. Note that although the following description will discuss in detail an image forming apparatus of a configuration for negatively charged toner, when positively charged toner is to be used, polarities of applied voltages should be set accordingly.

Figure 2:
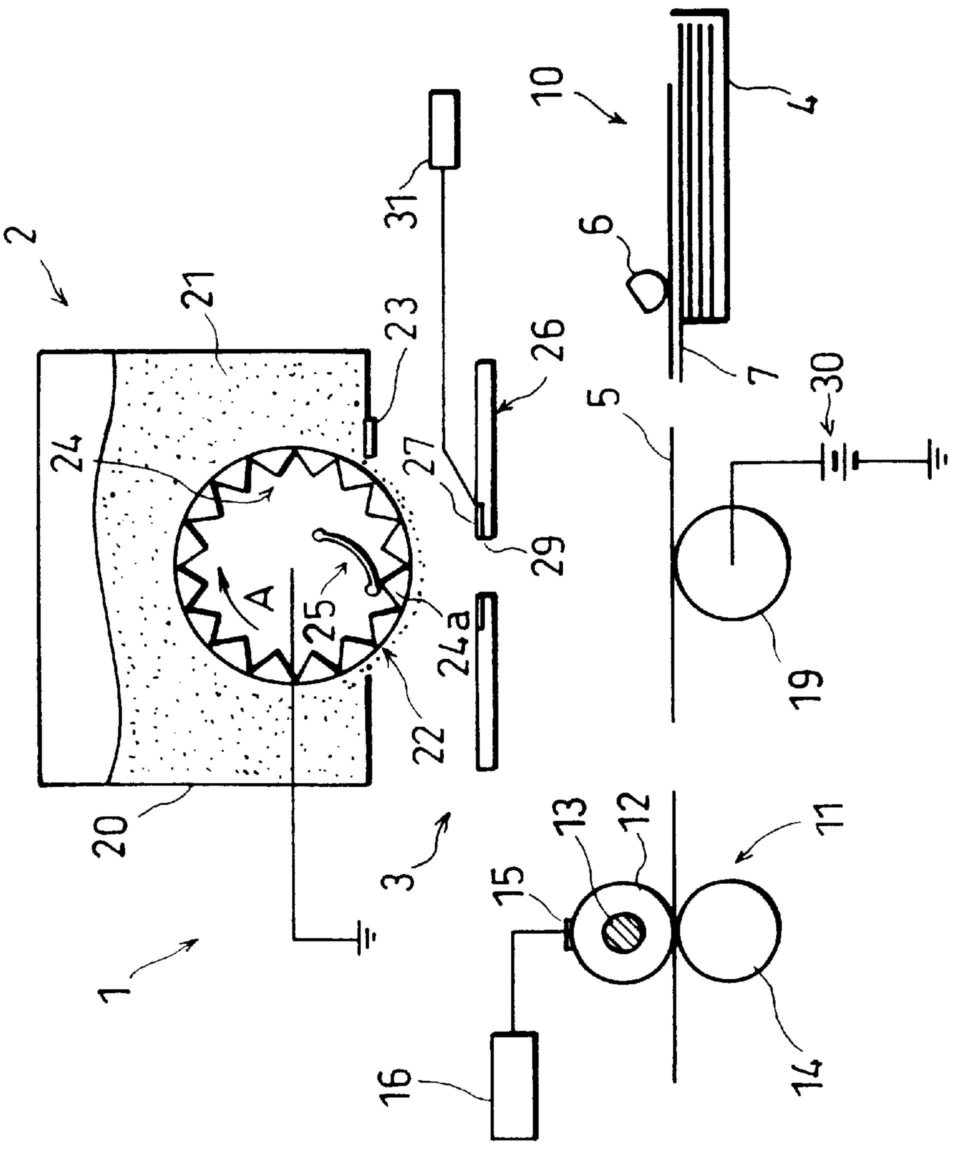
FIG. 2 is a cross-sectional view schematically showing the whole configuration of the image forming apparatus.

An image forming apparatus of the present embodiment, as shown in FIG. 2, includes an image forming section 1 composed of a toner supply section 2 and a print section 3. The image forming section 1 visualizes an image on a sheet of paper (recording medium) 5 with toner 21 as image visualizing particles in accordance with an image signal. That is, the present image forming apparatus directly forms an image on a sheet of paper 5 by projecting toner 21 in a controlled manner in accordance with an image signal, so that the toner 21 adheres to the sheet of paper 5.

A paper feeder 10 is provided where the sheet of paper 5 is fed to the image forming section 1. The paper feeder 10 is composed of a paper cassette 4 for storing the sheet of paper 5 that is a recording medium, a pickup roller 6 for sending out the sheet of paper 5 from the paper cassette 4, and a paper feed guide 7 for guiding the fed sheet of paper 5. The paper feeder 10 is also equipped with a paper feed sensor (not shown) for detecting the sheet of paper 5 having been fed. The pickup roller 6 is driven to rotate by a drive device (not shown).

A fixing section 11 is provided where the sheet of paper 5 is ejected from the image forming section 1. The fixing section 11 fixes with heat and pressure a toner image formed on the sheet of paper 5 by the image forming section 1. The fixing section 11 is composed of a heat-up roller 12, a heater 13, a press roller 14, a temperature sensor 15 and a temperature control circuit 16.

The heat-up roller 12 is made of, for example, a 2 mm thick aluminum pipe. The heater 13 is made of, for example, a halogen lamp and provided inside the heat-up roller 12. The press roller 14 is made of, for example, a silicon resin and disposed to oppose the heat-up roller 12. The heat-up roller 12 and the press roller 14 receives at both ends of the shafts thereof a load of, for example, 2 kg from a spring and the like (not shown) so as to hold and pressurize the sheet of paper 5. The temperature sensor 15 measures a surface temperature of the heat-up roller 12. The temperature control circuit 16 maintains the surface temperature of the heat-up roller 12 at, for example, 150° C. by controlling, for example, ON/OFF of the heater 13 in accordance with results of measurement by the temperature sensor 15.

The fixing section 11 is equipped with a paper ejection sensor (not shown) for detecting the sheet of paper 5 having been ejected. Materials for the heat-up roller 12, the heater 13, the press roller 14, etc. are not particularly limited. The surface temperature of the heat-up roller 12 is not particularly limited either. The fixing section 11 may be configured so as to fix the toner image on the sheet of paper 5 only either by heating the sheet of paper 5 or by pressurize the sheet of paper 5.

An ejection roller and an ejection tray (not shown) are provided where the sheet of paper 5 is ejected from the fixing section 11. The sheet of paper 5 having been processed by the fixing section 11 is ejected by the ejection roller and then received by the ejection roller. The heat-up roller 12, the press roller 14 and the ejection roller are driven to rotate by a drive device (not shown).

Meanwhile, the toner supply section 2 of the image forming section 1 is composed of a toner storage box 20 for storing the toner 21 as image visualizing particles, a toner holding body 22 for holding and transporting the toner 21, and a doctor blade 23, disposed inside the toner storage box 20, for charging the toner 21 and restricting the thickness of a toner layer held on the toner holding body 22 on the outer peripheral surface thereof. The toner holding body 22 is driven by a drive device (not shown) to rotate in the direction indicated by the arrow A in FIGS. 1 and 2 at a rotation speed of, for example, 30 mm/sec, measured on the surface of the toner holding body 22. The rotation speed of the toner holding body 22 is not particularly limited. The configuration of the toner holding body 22 will be described later in detail.

The doctor blade 23 is disposed where the surface of the toner holding body 22 comes out of the toner storage box 20 with rotation of the toner holding body 22, and separated from the outer peripheral surface of the toner holding body 22 by a distance of, for example, 60 μm. The toner 21 is a non-magnetic single component toner, and the particle diameter is, for example, 8 μm in average. The toner 21 is charged to a charge value of, for example, −8 μC/g to −10 C/g by the doctor blade 23. The distance between the doctor blade 23 and the toner holding body 22 is not particularly limited. The average particle diameter, the charge value, etc. of the toner 21 are not particularly limited either.

The print section 3 of the image forming section 1, made of, for example, a 1 mm thick aluminum pipe, includes an opposite electrode 19 opposing the outer peripheral surface of the toner holding body 22, a power source 30 for applying a voltage to the opposite electrode 19, and a control electrode 26 disposed between the toner holding body 22 and the opposite electrode 19. The opposite electrode 19 is placed to be separated from the outer peripheral surface of the toner holding body 22 by a distance of, for example, 1 mm. The power source 30 applies a voltage of, for example, 600 V to the opposite electrode 19, which generates an electric field necessary for projecting the toner 21 on the toner holding body 22 towards the opposite electrode 19.

The present image forming apparatus includes a main control section as a control circuit, an image processing section, an image information memory and an image formation control unit (not shown). The main control section controls the entire image forming apparatus. The image processing section converts image data obtained with an image reading device for reading an image of, for example, an original document into an image data format for printing. The image data information memory records the converted image data. The image formation control unit converts the image data obtained with the image processing section into image data to be given to the control electrode 26.

The control electrode 26 extends in two dimensions and opposes parallel to a tangential plane on the surface of the opposite electrode 19. The control electrode 26 has a structure through which the projected toner 21 can pass and travel from the toner holding body 22 towards the opposite electrode 19. The projection of the toner 21 from the toner holding body 22 towards the opposite electrode 19 is controlled by changing the potential applied to the control electrode 26 that, in turn, changes the electric field generated between the toner holding body 22 and the opposite electrode 19.

Figure 3:
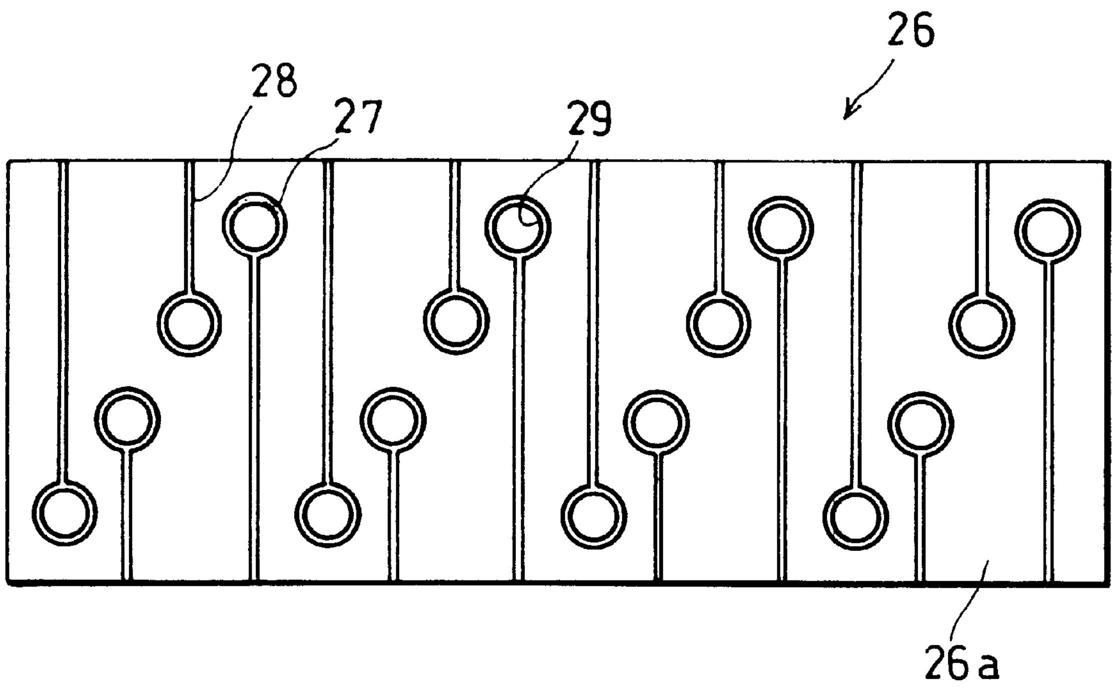
FIG. 3 is a plan view showing a control electrode incorporated in the image forming apparatus.

The control electrode 26 is disposed to be separated from the outer peripheral surface of the toner holding body 22 by a distance of, for example, 100 μm, and is supported by a support member (not shown). The control electrode 26, as shown in FIG. 3, is composed of an insulating substrate 26*a*, a high voltage driver (not shown) and ring-shaped conductive bodies independent from each other as ring-shaped electrodes 27.

The substrate 26*a* is made of, for example, a polyimide resin so as to have a thickness of 25 μm. The substrate 26*a* is provided with holes that form later-mentioned gates 29. The ring-shaped electrode 27, made of, for example, a copper foil, is provided so as to encircle the hole on the surface of the substrate 26*a* facing the toner holding body 22, and arranged in a predetermined manner. The ring-shaped electrode 27 is 220 μm in diameter and 30 μm in thickness. The aperture portion of the ring-shaped electrode 27 is formed to be, for example, 200 μm in diameter, functioning as a passage portion through which the toner 21 travels from the toner holding body 22 towards the opposite electrode 19. In the following description, the passage portion will be referred to as a gate 29. The distance between the control electrode 26 and the toner holding body 22 is not particularly limited. In addition, for example, sizes of the gates 29, materials, thicknesses of the substrate 26*a* and of the ring-shaped electrodes 27 are not particularly limited either.

There are, for example, 2560 pieces of ring-shaped electrodes 27 provided around the gates 29. Each of the ring-shaped electrodes 27 is electrically connected via a power supply wire 28 and a high voltage driver (not shown) to a control power source section 31 (to be described later in detail). The number of the ring-shaped electrodes 27 corresponds to the resolution 300 DPI (dot per inch) in the width of A4-sized paper, and is not particularly limited.

The surface of the ring-shaped electrode 27 and the surface of the power supply wire 28 are covered with a 30 μm thick insulating layer (not shown). The insulating layers ensure insulation between the ring-shaped electrodes 27, between the power supply wires 28, and between the ring-shaped electrodes 27 and the power supply wires 28 that are not connected with each other. Materials, thicknesses, etc. of the insulating layers are not particularly limited.

A pulse (that is, a voltage) is applied to the ring-shaped electrodes 27 of the control electrode 26 by the control power source section (control means) 31 in accordance with an image signal, as shown in FIG. 2. That is, when the toner 21 held on the toner holding body 22 is to pass towards the opposite electrode 19, the control power source section 31 applies a voltage of, for example, 150 V to the ring-shaped electrodes 27. On the other hand, when the toner 21 held on the toner holding body 22 is not to pass towards the opposite electrode 19, the control power source section 31 applies a voltage of, for example, −200 V to the ring-shaped electrodes 27. A potential applied to the control electrode 26 is controlled in accordance with an image signal in this manner. Then as the sheet of paper 5 is placed on the side of the opposite electrode 19 opposing the toner holding body 22, a toner image is directly formed on the surface of the sheet of paper 5 in accordance with the image signal. The control power source section 31 is controlled by a control-electrode control signal sent from the image formation control unit (not shown).

Figure 1:
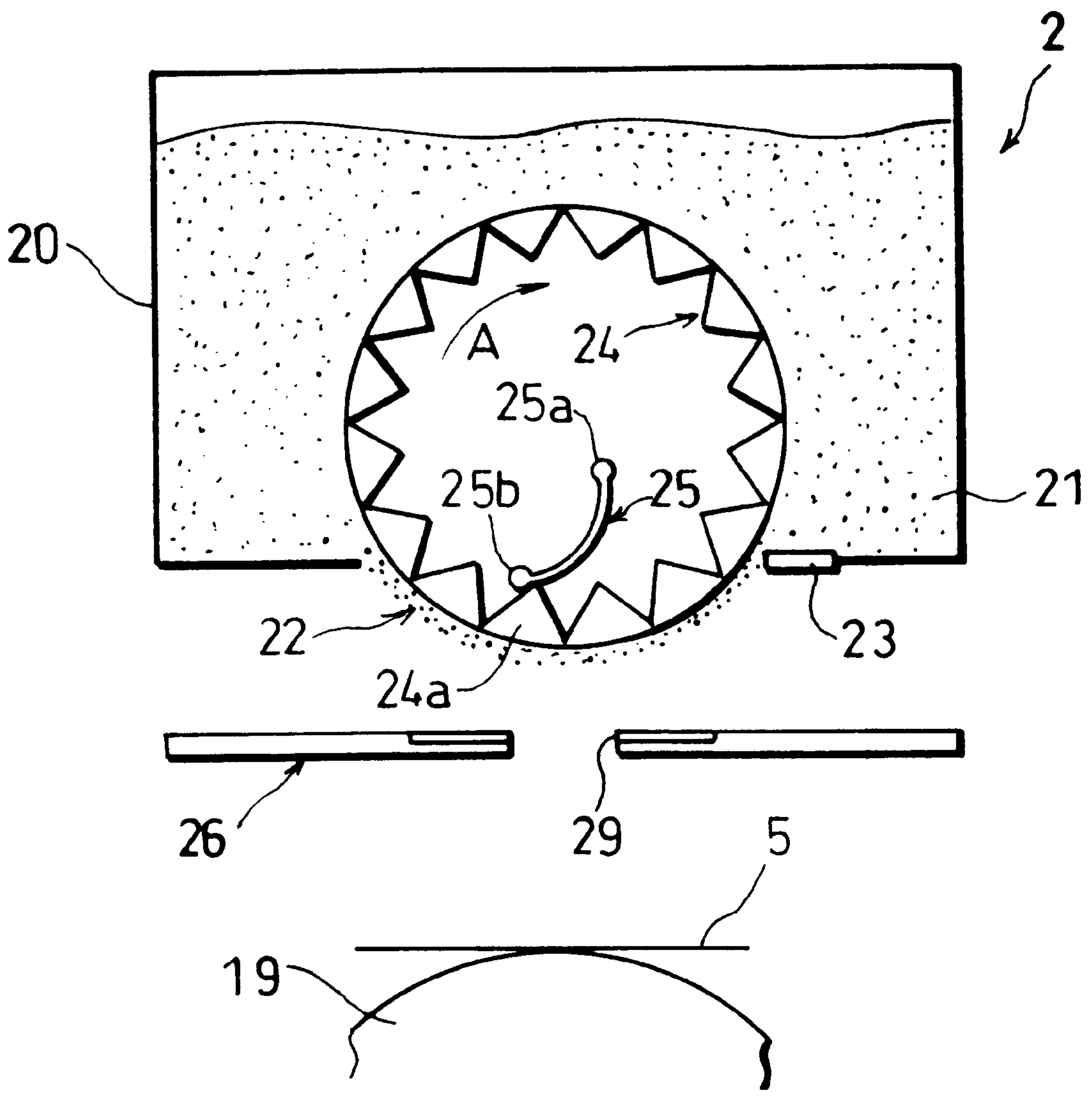
FIG. 1 is a cross-sectional view showing a configuration example of a toner holding body incorporated in an image forming apparatus in accordance with the present invention.

Next, referring to FIG. 1, the following description will discuss a configuration of the toner holding body 22 in detail.

As shown in FIG. 1, a convex-concave member 24 with a plurality of protruding portions 24*a* is provided inside the toner holding body 22. In the present embodiment, the protruding portion 24*a* is made of a stainless steel (Brinell hardness of 150). The protruding portions 24*a,* having a triangle-pole-like shape, are disposed on the inner surface of the toner holding body 22. That is, the convex-concave member 24 gives a convex and concave feature to the inner surface of the toner holding body 22.

A hitting member 25 is provided inside the toner holding body 22 so that the protruding portion 24*a* opposing the opposite electrode 19 is hit by a free end portion 25*b* (hereinafter, will be simply referred to as an end portion 25*b*) with rotation of the toner holding body 22. This, when the hitting member 25 hits the protruding portion 24*a,* can weaken adhesive forces of the toner 21 in an area of the surface of the toner holding body 22 opposing the opposite electrode 19, that is, the adhesive forces of the toner 21 in a toner projection area, to the toner holding body 22. The hitting member 25 has a fixed end portion 25*a* (hereinafter, will be simply referred to as an end portion 25*a*) that is fixed on the upstream side of the end portion 25*b* with respect to the rotation direction of the toner holding body 22.

In the present embodiment, the hitting member 25 is made of a nylon (Rockwell hardness R scale 120). Consequently, the protruding portion 24*a* is harder than hitting member 25.

Here, supposing that the convex-concave member 24 composed of the protruding portions 24*a* has a close hardness with the hitting member 25, when the hitting member 25 comes in contact with or hits the convex-concave member 24, the hitting member 25 and the convex-concave member 24 wear or break in a similar manner. Therefore, both the hitting member 25 and the convex-concave member 24 need to be replaced with new ones. However, in the present embodiment, since the hardnesses are set as specified earlier, the hitting member 25 wears more easily than the convex-concave member 24. This provides protection to the convex-concave member 24 from wearing or breaking with the contact or hit by the hitting member 25.

Moreover, since the hardnesses of the convex-concave member 24 and the hitting member 25 in the present embodiment are set as specified earlier, only the hitting member 25 should be replaced with a new one after a long use thereof. This reduces the cost for replacement parts. In addition, since only one of the members needs to be replaced, maintenance can be easily performed.

After a long use, the toner 21 sticks to the surface of the toner holding body 22, or the surface of the toner holding body 22 has scratches. Therefore, the toner holding body 22 needs to be replaced with a new one after every certain period of time in use.

Therefore, the hitting member 25 may be specified to be harder than the convex-concave member 24 so that the convex-concave member 24 wears more easily: the hitting member 25 is made of stainless steel (Brinell hardness of 150), and the protruding portion 24*a* of the convex-concave member 24 is made of nylon (Rockwell hardness R scale 120). This provides protection to the hitting member 25 from wearing or breaking with the contact or hit of the convex-concave member 24, and also enables the convex-concave member 24 to be replaced at the same time as the toner holding body 22 is replaced. Therefore, with the hardness arranged as above, the maintenance can be easily done by replacing the toner holding body 22 and the convex-concave member 24 together at the same time.

The end portion 25*a* of the hitting member 25 is fixed on the upstream side of the end portion 25*b* with respect to the rotation direction of the toner holding body 22. Consequently the end portion 25*b* of the hitting member 25 hits the protruding portion 24*a* softly with rotation of the toner holding body 22. This can provide protection to the protruding portion 24*a* and the hitting member 25 from breaking, and also reduce the frequency of the maintenance.

In other words, if the end portion 25*a* of the hitting member 25 is fixed on the downstream side of the end portion 25*b* with respect to the rotation direction of the toner holding body 22, when the end portion 25*b* of the hitting member 25 hits the protruding portion 24*a,* the protruding portion 24*a* and the hitting member 25 receive a strong impact. This may break both the protruding portion 24*a* and the hitting member 25. Taking this into account, the end portion 25*a* of the hitting member 25 is fixed in this manner in the present embodiment.

Moreover, in the present embodiment, since the protruding portion 24*a* of the convex-concave member 24 is formed to have a triangle-pole-like shape, the hitting member 25 surely hits the protruding portion 24*a* with rotation of the toner holding body 22. Therefore, the surface of the toner holding body 22 surely vibrates.

Note that the shape of the protruding portion 24*a* of the convex-concave member 24 is not particularly limited, as long as the convex-concave member 24 is arranged to form convexes and concaves on the inner surface of the toner holding body 22, and the surface of the toner holding body 22 vibrates with the hit between the convex-concave member 24 and the hitting member 25. That is, the protruding portion 24*a* may be formed to have a column shape, a semi-column-like shape, a prism shape other than the triangle-pole-like shape, etc. so that the hitting member 25 hits the convex-concave member 24.

Figure 4:
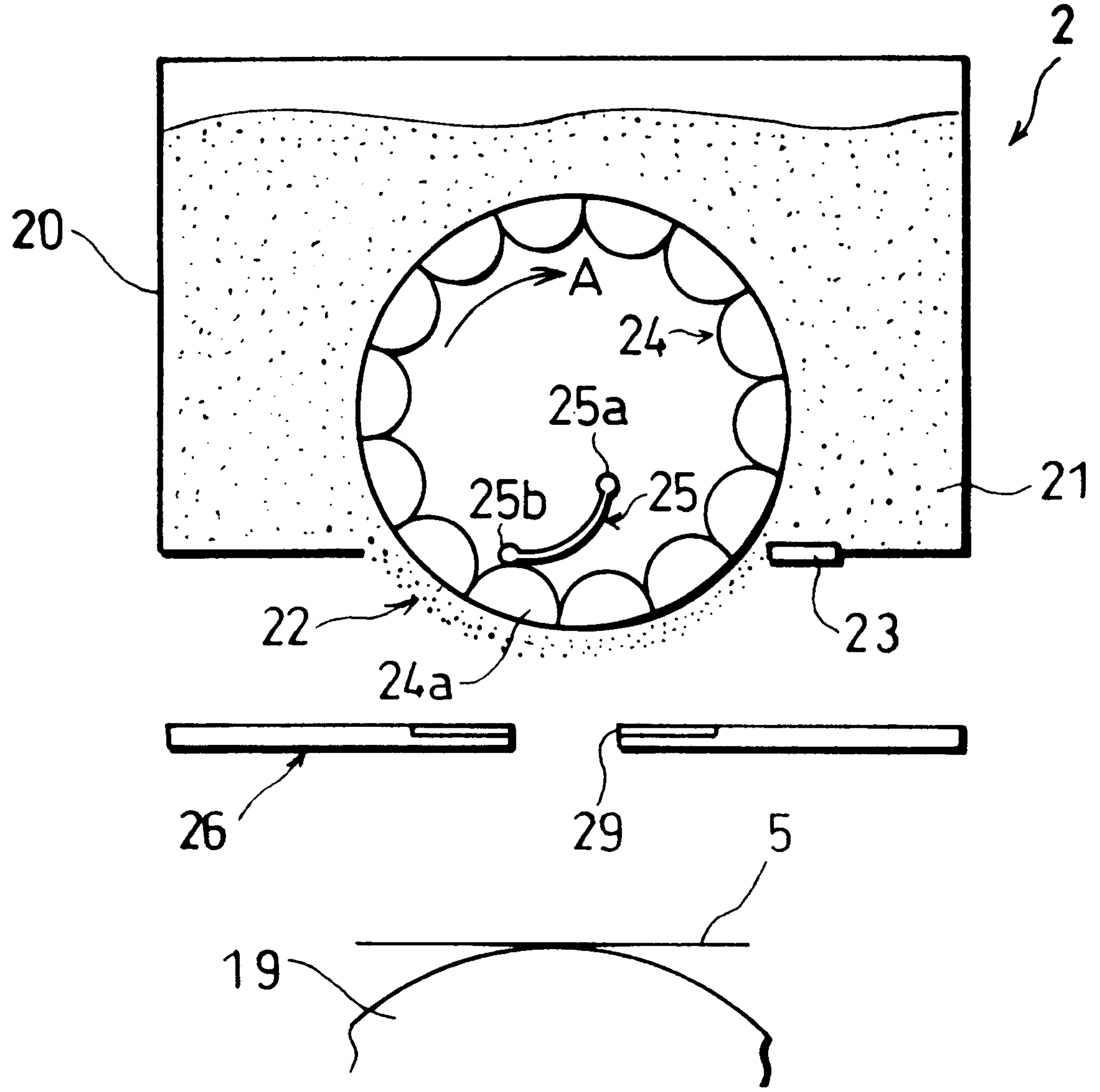
FIG. 4 is a cross-sectional view showing a differently shaped convex-concave member provided inside the toner holding body.

However, if the contact portions of the convex-concave member 24 and the hitting member 25 are sharp, the convex-concave member 24 and the hitting member 25 break easily. On the other hand, as shown in FIG. 4, the protruding portion 24*a* formed in a semi-column-like shape weakens an impact when the hitting member 25 hits the protruding portion 24*a.* This can provide protection to the convex-concave member 24 and the hitting member 25 from breaking, and also reduce the frequency of the maintenance and the replacement of a broken part. Therefore, preferably, the contact portions of the convex-concave member 24 and the hitting member 25 are not sharp.

Next, referring to FIG. 2, the following description will discuss an image forming operation by the present image forming apparatus.

First, for example, an original document to be copied is placed on the image reading section, and a copy start button (not shown) is pressed. The main control section, on reception of this input, starts the image forming operation. That is, an original document image is read by the image reading section, the image data is processed by the image processing section, and then the processed image data is stored in the image information memory. The image data stored in the image information memory is transmitted to the image formation control unit. The image formation control unit starts converting the inputted image data into the control-electrode control signal that is to be given to the control electrode 26.

As the image formation control unit forms a predetermined amount of such control-electrode control signals, a drive device (not shown) starts operation, driving the pick-up roller 6 shown in FIG. 2 to rotate. As the pick-up roller 6 sends the sheet of paper 5 in the paper cassette 4 towards the image forming section 1, the paper feed sensor detects the sheet of paper 5 having been fed in an ordinary manner. The sheet of paper 5 sent out by the pick-up roller 6 is transported to a place opposing the toner holding body 22 in synchronization with the image signal.

In the toner supply section 2, the toner 21 stored in the toner storage box 20 is supplied onto the toner holding body 22. The toner 21 is held on the toner holding body 22 with adhesive forces such as an image force, a van der Waals force and a liquid bridge force, and transported towards the toner projection area with rotation of the toner holding body 22. Here, the toner 21 on the toner holding body 22 is limited in thickness by the doctor blade 23 provided where the surface of the toner holding body 22 comes out of the toner storage box with rotation of the toner holding body 22, and charged, for example, negatively by abrasion with the doctor blade 23. The toner holding body 22 rotates and transports the charged toner 21 to the toner projection area.

Here, when the toner holding body 22 rotates, the end portion 25*b* of the hitting member 25 (see FIG. 1), having been in contact with one of the protruding portions 24*a* of the convex-concave member 24, is separated therefrom, and hits an adjacent protruding portion 24*a* disposed on the upstream side of the first protruding portion 24*a* with respect to the rotation direction of the toner holding body 22. As a result, the surface of the toner holding body 22 vibrates, and the toner 21 adhering to the surface of the toner holding body 22 is vibrated. Therefore, the toner 21 transported to the toner projection area receives a force in accordance with an acceleration caused by the vibration of the surface of the toner holding body 22, thus being released from the adhesive forces such as an image force, a van der Waals force and a liquid bridge force.

Meanwhile, in the image formation control unit, the image signal is supplied to the control electrode 26 in synchronization with the supply of the sheet of paper 5 to the print section 3. The control power source section 31 applies a voltage of either 150 V or −200 V to the ring-shaped electrode 27 of the control electrode 26 in accordance with the control-electrode control signal, so as to control the electric field in a neighborhood of the control electrode 26. That is, the gate 29 of the control electrode 26 either stops or allows the projection of the toner 21 from the toner holding body 22 towards the opposite electrode 19 according to the image data. In this manner, a toner image in accordance with the image signal is formed on the sheet of paper 5 that is moving at a speed of 30 mm/sec towards the ejection side with rotation of the opposite electrode 19.

The sheet of paper 5 on which the toner image is formed is transported to the fixing section 11, where the toner image is fixed to the sheet of paper 5. The sheet of paper 5 to which the toner image is fixed is ejected to the paper tray by the ejection roller, and then the paper ejection sensor detects the paper having been ejected in an ordinary manner. The main control section judges, according to this detection operation, that the print operation has been completed in an ordinary manner. A high quality image is formed on the sheet of paper 5 with the image forming operation explained above.

As discussed so far, the image forming apparatus of the present embodiment forms a desired image on the sheet of paper 5 by controlling the projection of the toner 21 from the rotating toner holding body 22 towards the opposite electrode 19 with the control electrode 26 to which the voltage varying in accordance with the image signal is applied, and is configured so that the protruding portions 24*a* and the hitting member 25 for hitting the protruding portions 24*a* with rotation of the toner holding body 22 are provided on the inner surface of the toner holding body 22.

With such a relatively simple configuration in which the hitting member 25 and the convex-concave member 24 having the protruding portions 24*a* are provided inside the toner holding body 22, it is possible to vibrate the surface of the toner holding body 22 and thereby to weaken the adhesive forces of the toner 21 to the toner holding body 22. Therefore, it is not necessary to use a piezoelectric vibrator, a cam roller, etc. that have been conventionally used to vibrate the surface of the toner holding body 22. As a result, it is neither necessary to provide a high voltage power source, a special circuit, etc. for driving them. Therefore, with the configuration, it is possible to achieve weakening of the adhesive forces of the toner 21 to the toner holding body 22 with an apparatus of a simpler configuration than the conventional apparatus. Besides, since the configuration of the apparatus is simplified, it becomes possible to make attempts to reduce the size and costs of the apparatus.

In addition, the image forming apparatus of the present embodiment has a configuration in which the hitting member 25 is provided so as to hit the protruding portion 24*a* only in the toner projection area.

The weakening of the adhesive forces of the toner 21 is needed in the toner projection area as described above, because an adhesive force of a certain strength is necessary outside the toner projection area for transportation of the toner 21.

Therefore, in the present embodiment the protruding portion 24*a* of the convex-concave member 24 is hit by the end portion 25*b* of the hitting member 25, especially, at a place opposing the opposite electrode 19. This generates the strongest vibration in the area of the surface of the toner holding body 22 opposing the opposite electrode 19, that is, in the toner projection area, thereby weakening the adhesive forces of the toner 21 in the toner projection area. Meanwhile, it is ensured that the adhesive forces of the toner 21 adhering to the surface of the toner holding body 22 have a necessary strength outside the toner projection area.

Therefore, with the configuration, it is possible to weaken the adhesive forces of the toner 21 only in the toner projection area by selectively vibrating the surface of the toner holding body 22 in the toner projection area. As a result, it is possible to project the toner 21 only in the toner projection area with a low voltage, and still to ensure that an enough amount of the toner 21 is transported to the toner projection area so that a high quality image can always be formed in a stable manner.

Figure 5:
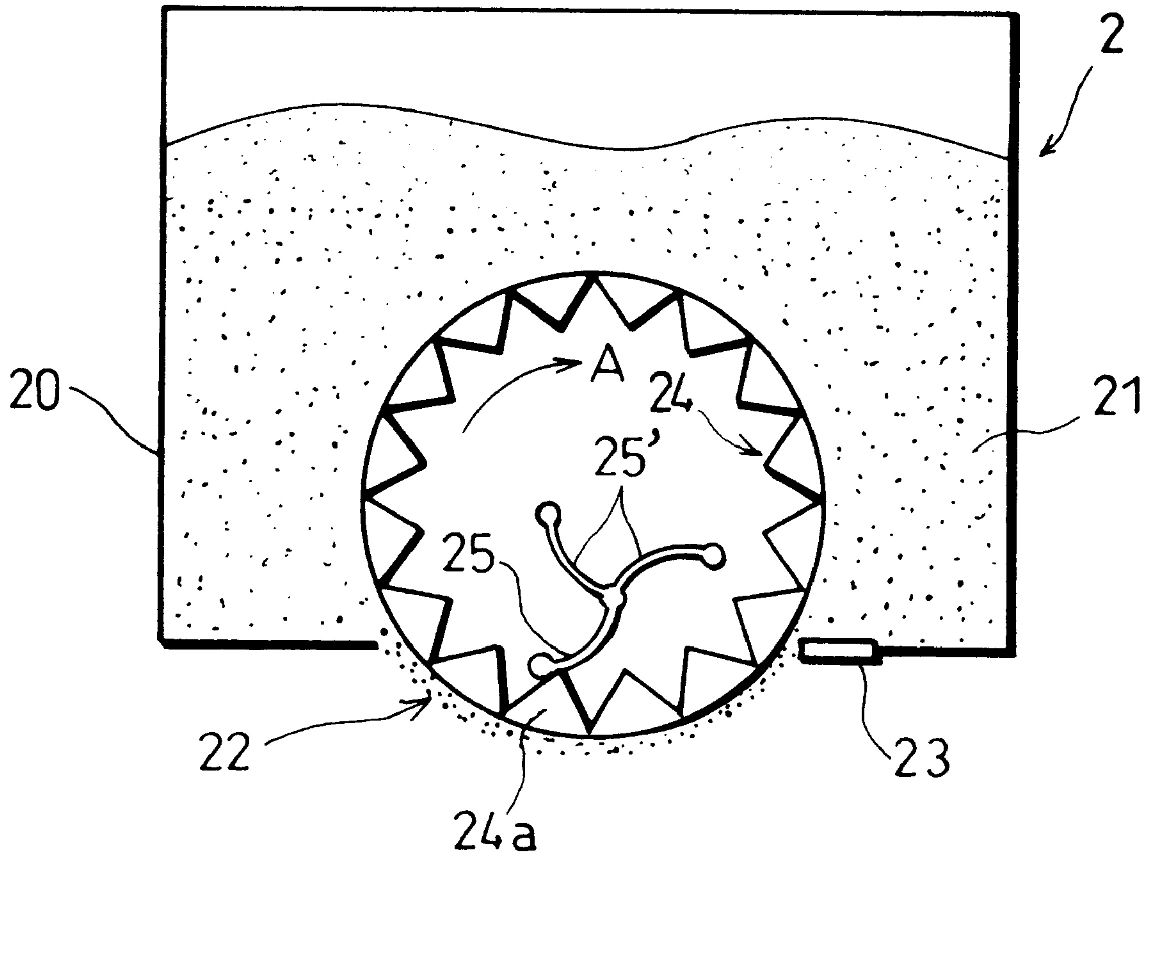
FIG. 5 is a cross-sectional view showing a configuration of another toner holding body.

Note that when the end portion 25*b* of the hitting member 25 hits the protruding portion 24*a,* the end portion 25*b* may wear or the hitting member 25 may break. So, in a preferable configuration, such as shown in FIG. 5, at least one hitting member 25' that is replaceable with the hitting member 25 is provided inside the toner holding body 22 in addition to the hitting member 25. In the present embodiment, two hitting members 25' are provided for replacement.

With the configuration, since at least one hitting member 25' that is replaceable with the hitting member 25 is provided inside the toner holding body 22, if the hitting member 25 wears or breaks as it hits the protruding portion 24*a* of the convex-concave member 24, the broken hitting member 25 can be replaced with the new hitting member 25'. In addition, since the hitting member 25' is provided inside the toner holding body 22, it is easy to replace the hitting member 25.

That is, if there is only one hitting member 25 provided inside the toner holding body 22, every time the hitting member 25 wears or breaks, the hitting member 25 must be taken out of the toner holding body 22 and replaced with a new hitting member 25', causing a great nuisance. However, the configuration introduced here enables the first few replacements of the hitting member 25 to be easily done inside the toner holding body 22; when the hitting member (s) 25' is(are) used up for replacement, the worn hitting members 25 and 25' are taken out all together, and there provided inside the toner holding body 22 a new hitting member 25 and (*a*) hitting member(s) 25'.

Therefore, as discussed above, if the hitting member includes at least two hitting members (the hitting members 25 and 25') that are provided so as to be replaceable, since a worn or broken hitting member 25 can be easily replaced with a new one inside the toner holding body 22 according to the degree of wear and break, the maintenance can be easily done. Besides, the removal of a plurality of worn hitting members 25 and 25' can be performed at the same time with the installation of a plurality of new hitting members 25 and 25'. This can improve efficiency in the replacement and reduce the frequency thereof, compared to a case where there is provided inside the toner holding body 22 only one hitting member 25 which needs to be replaced every time it wears or breaks.

If the hitting members 25' for replacement are provided in a greater number inside the toner holding body 22, it is possible to reduce the frequency of big operations for replacing the worn hitting members 25 and 25' all together with the new hitting members 25 and 25'. Therefore, time spent on replacing worn parts and the like can be saved to some degree, and it is still possible to form an image in a stable manner over a long period of time.

Second Embodiment

In FIG. 2, after the projection of the toner 21, there is "a blank" in the toner 21 on the surface of the toner holding body 22 in accordance with an outputted image. The blank indicates that the result of the last outputted image still remains as an image memory on the surface of the toner holding body 22. The image memory has undesirable effects for formation of a next image: for example, the toner 21 is formed non-uniformly on the toner holding body 22. The image memory is therefore preferably erased if possible.

Figure 6:
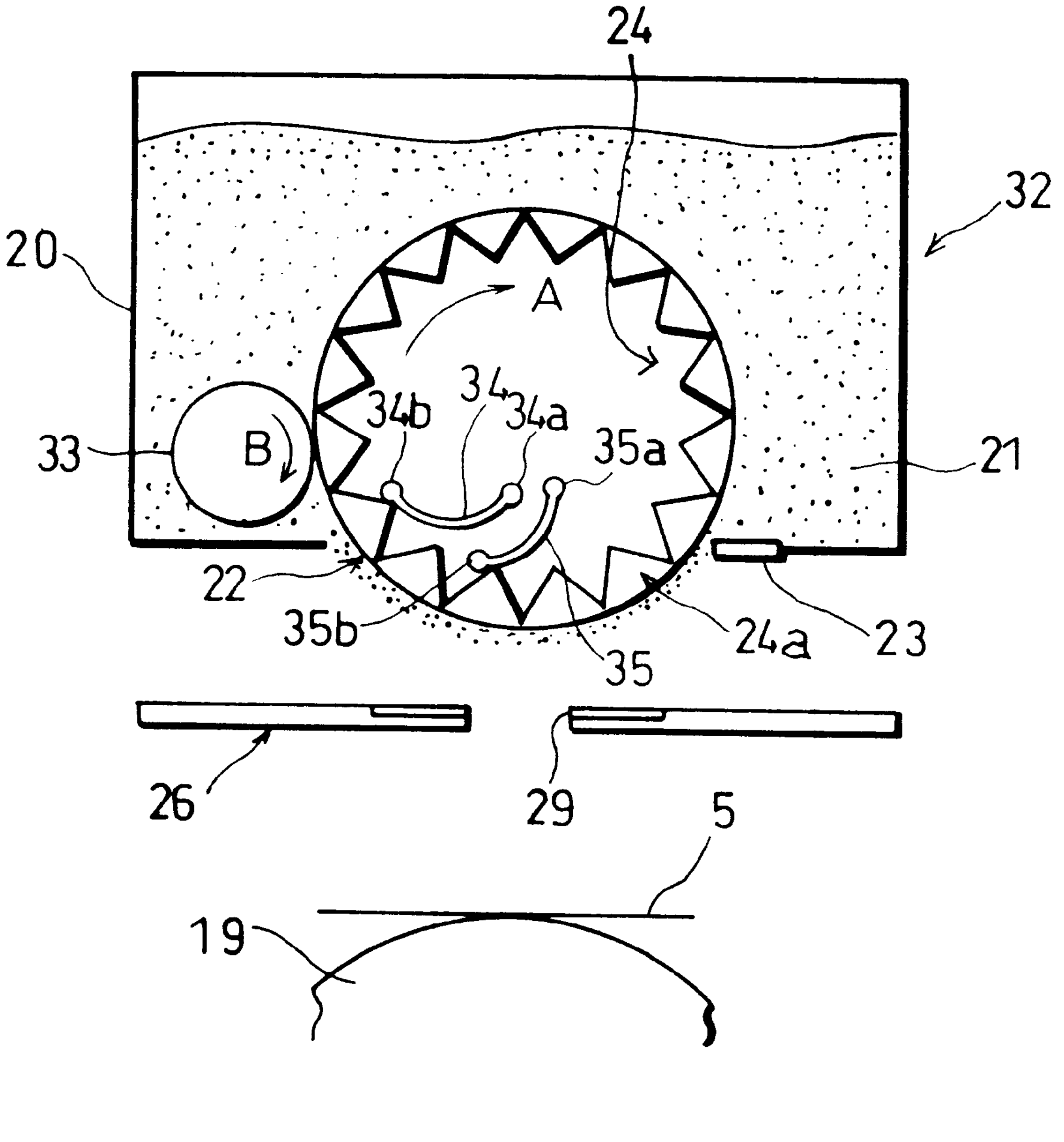
FIG. 6 is a cross-sectional view showing a configuration of another toner supply section.

Referring to FIG. 6, the present embodiment will discuss an image forming apparatus that is provided with a cleaning roller 33 for removing toner 21 from the surface of a toner holding body 22, and that is capable of efficiently and surely removing the image memory. Note that in the present embodiment, a toner supply section 32 is adopted in the image forming apparatus of the first embodiment. Therefore, the following description will focus on an arrangement and functions of the toner supply section 32, and description of arrangements and functions that are common to the first and present embodiments is omitted. Besides, for convenience, members of the present embodiment that have the same function as members of the first embodiment are indicated by the same reference numerals and description thereof is omitted.

As shown in FIG. 6, the toner supply section 32 is composed of a toner storage box 20 for storing the toner 21, a toner holding body 22 for holding and transporting the toner 21, a doctor blade 23, and a cleaning roller 33. The doctor blade 23, disposed inside the toner storage box 20, charges the toner 21 and restricts the thickness of the toner layer held on the toner holding body 22 on the outer peripheral surface thereof. The cleaning roller 33 is driven to rotate by a drive device (not shown) in, for example, the direction indicated by the arrow B in FIG. 6, and cleans the surface of the toner holding body 22 by removing the whole toner 21 on the toner holding body 22. The cleaning roller 33 is disposed in the toner storage box 20 so as to come in contact with the toner holding body 22 in a neighborhood where the toner 21 on the toner holding body 22 goes into the toner storage box 20 after passing a toner projection area with rotation of the toner holding body 22.

A convex-concave member 24 with a plurality of protruding portions 24*a* is provided in the toner holding body 22 and gives a convex and concave feature to the inner surface of the toner holding body 22. Although the protruding portion 24*a* in the present embodiment has a triangle-pole-like shape, this is not the only possible shape. It is needless to mention that the shape of the protruding portion 24*a* may be specified in the same manner as in the first embodiment, and that those shapes produce the same effects as in the first embodiment.

A hitting member (second hitting member) 34 is provided in the toner holding body 22 so that the protruding portion 24*a* almost opposing the cleaning roller 33 is hit by a free end portion 34*b* (hereinafter, will be simply referred to as an end portion 34*b*) with rotation of the toner holding body 22. The hitting member 34 has a fixed end portion 34*a* (hereinafter, will be simply referred to as an end portion 34*a*) that is fixed inside the toner holding body 22 on the upstream side of the end portion 34*b* with respect to the rotation direction of the toner holding body 22.

Besides the hitting member 34, a hitting member (first hitting member) 35 is also provided inside the toner holding body 22 so that the protruding portion 24*a* opposing the opposite electrode 19 is hit by a free end portion 35*b* (hereinafter, will be simply referred to as an end portion 35*b*) with rotation of the toner holding body 22. The hitting member 35 has a fixed end portion 35*a* (hereinafter, will be simply referred to as an end portion 35*a*) that is fixed inside the toner 22 on the upstream side of the end portion 35*b* with respect to the rotation direction of the toner holding body 22.

Since the fixed end 34*a* of the hitting member 34 and the fixed end 35*a* of the hitting member 35 are fixed in this manner, when the toner holding body 22 rotates, the fixed end 34*b* of the hitting member 34 and the fixed end 35*b* of the hitting member 35 hit the respective protruding portions 24*a* softly. As a result, it is possible to provide protection to the protruding portions 24*a* and the hitting members 34 and 35 from breaking, and also to reduce frequency of maintenance.

Note that the hardnesses and materials for the convex-concave member 24 and the hitting members 34 and 35 may be specified in the same manner as in the first embodiment, and that those specifications produce the same effects.

As the toner holding body 22 is driven to rotate by a drive device (not shown), the toner holding body 22 rotates in the direction indicated by the arrow A in FIG. 6. The toner 21 adhering to the surface of the toner holding body 22 is transported to the toner projection area in this manner. The end portion 35*b* of the hitting member 35 disposed inside the toner holding body 22 hits the protruding portion 24*a* of the convex-concave member 24 in the toner projection area. As a result, the surface of the toner holding body 22 vibrates. The toner 21 on the toner holding body 22 receives a force in accordance with an acceleration caused by the vibration of the surface of the toner holding body 22, and therefore the adhesive forces such as an image force, a van der Waals force and a liquid bridge force are weakened. The toner 21 on the toner holding body 22 receives an electric field in accordance with an image signal, and the toner 21 corresponding to an image part is projected to pass through gates 29 of the control electrode 26 towards the opposite electrode 19.

Meanwhile, a non-uniform toner layer is held on the surface of the toner holding body 22 after passing the toner projection area, since the toner 21 corresponding to an image part has been projected. As the toner holding body 22 rotates, the toner layer goes into the toner storage box 20 again and transported to an area between the toner holding body 22 and the cleaning roller 33 (hereinafter, will be referred to as the cleaning area).

Here, since the fixed end 34*b* of the hitting member 34 hits the protruding portion 24*a* opposing the cleaning roller 33 with rotation of the toner holding body 22, the surface of the toner holding body 22 vibrates in the cleaning area. Therefore, the toner 21 on the toner holding body 22 receives a force from the surface of the toner holding body 22 in accordance with the acceleration caused by the vibration, and the toner 21 vibrates. The adhesive forces such as an image force, a van der Waals force and a liquid bridge force are weakened in this manner.

The toner 21 with the weaker adhesive forces is all scraped off by the cleaning roller 33 disposed so as to be in contact with the surface of the toner holding body 22. The surface of the toner holding body 22, from which the toner 21 is all scraped off by passing the cleaning area, is provided with new toner 21 that is to be used for a next image formation.

As described so far, the image forming apparatus of the present embodiment is configured so that the hitting member is composed of the hitting members 35 and 34, the hitting member 35 is disposed to hit the protruding portion 24*a* corresponding to the toner projection area, and the hitting member 34 is disposed to hit the protruding portion 24*a* corresponding to the cleaning area for removing the toner 21 from the toner holding body 22.

With the configuration, the hitting member 35 is disposed to hit the protruding portion 24*a* corresponding to the toner projection area. The configuration vibrates most strongly the surface of the toner holding body 22 corresponding to the toner projection area, thereby considerably weakening the adhesive forces of the toner 21 adhering thereto.

Meanwhile, in the cleaning area, the surface of the toner holding body 22 is vibrated by the hitting member 34 that hits the protruding portion 24*a* opposing the cleaning roller 33. As a result, the toner 21 in the cleaning area is removed from the toner holding body 22. That is, since the surface of the toner holding body 22 corresponding to the cleaning area vibrates, the cleaning efficiency improves, and the whole toner 21 is surely removed from the surface of the toner holding body 22.

That is, as the toner 21 remaining on the surface of the toner holding body 22 after the projection operation of the toner 21 is transported to the cleaning area, the hitting member 34 hits the protruding portion 24*a* with rotation of the toner holding body 22. This vibrates the surface of the toner holding body 22 corresponding to the cleaning area, and shakes the toner 21 adhering to the surface of the toner holding body 22. Consequently, the adhesive forces of the toner 21 to the toner holding body 22 are weakened. It becomes easier to remove the toner 21 from the surface of the toner holding body 22 corresponding to the cleaning area with an ordinary cleaning process when the adhesive forces of the toner 21 are weakened.

Therefore, with the configuration, the weakening of the adhesive forces of the toner 21 in the cleaning area can facilitate easy removal of the toner 21 adhering to the surface of the toner holding body 22 without being projected with the cleaning roller 33. As a result, the cleaning efficiency of the surface of the toner holding body 22 is improved in the cleaning area. In addition, since this surely removes the image memory formed on the toner holding body 22, when images are formed consecutively, there is no affection from the previous image memories and high quality images can always be formed in a stable manner.

Note that the hitting member 35 is disposed to oppose the opposite electrode 19 in the present embodiment. However, the hitting member 35 may be otherwise disposed as long as the hitting member 35 vibrates the surface of the toner holding body 22 by hitting the convex-concave member 24, and a toner projection voltage is thereby reduced.

Note also that the two hitting members 34 and 35 are provided inside the toner holding body 22 in the present embodiment. However, as discussed in the first embodiment, a plurality of hitting members for replacement (not shown) may be provided inside the toner holding body 22 so as to be replaceable with the hitting members 34 and 35 when they wear or break. In this case, since the hitting members 34 and 35 can be replaced inside the toner holding body 22, maintenance can be easily and efficiently performed.

Third Embodiment

Figure 7:
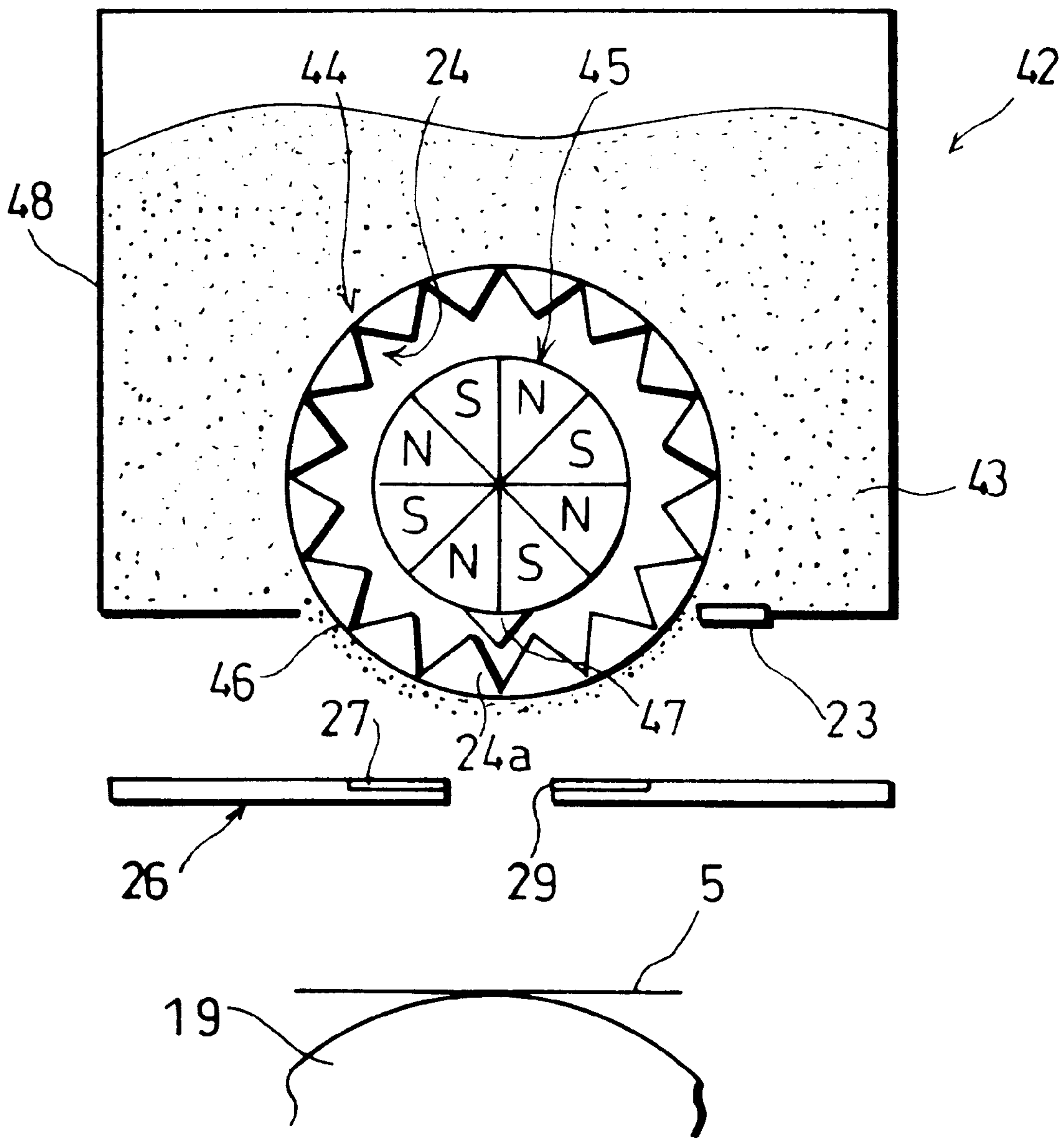
FIG. 7 is a cross-sectional view showing a configuration of even another toner supply section.

Next, referring to FIG. 7, the following description will discuss another embodiment in accordance with the present invention. The present embodiment will describe an image forming apparatus for forming an image by using magnetic toner 43. Note that in the present embodiment, a toner supply section 42 is adopted in the image forming apparatuses discussed in the first and second embodiments. Therefore, the following description will focus on an arrangement and functions of the toner supply section 42, and description to arrangements and functions that are common to the first, second and present embodiments is omitted. Besides, for convenience, members of the present embodiment that have the same function as members of the first and second embodiments are indicated by the same reference numerals and description thereof is omitted.

As shown in FIG. 7, a toner holding body 44 is composed of a rotatable mag roller 45 and a rotatable sleeve 46. The mag roller 45 has a function of holding the magnetic toner 43 on the sleeve 46 with a magnetic force. The mag roller 45 has on the surface thereof a protruding portion (first protruding portion) 47 for hitting a plurality of protruding portions (second protruding portions) 24*a* with rotation of the sleeve 46.

A convex-concave member 24 having the protruding portions 24*a* are provided on the inner surface of the sleeve 46, and gives a convex and concave feature to the inner surface of the sleeve 46. In the present embodiment, the protruding portion 47 is disposed to hit the protruding portion 24*a* almost opposing the opposite electrode 19 (i.e., the protruding portion 24*a* corresponding to a toner projection area) with rotation of the sleeve 46.

The protruding portions 24*a* of the convex-concave member 24 and the protruding portion 47 in the present embodiment have a triangle-pole-like shape, and produce the same effects as in the first embodiment. However, the shapes of the protruding portions 24*a* of the convex-concave member 24 and the protruding portion 47 are not particularly limited and may be specified in the same manner as in the first embodiment.

Figure 8:
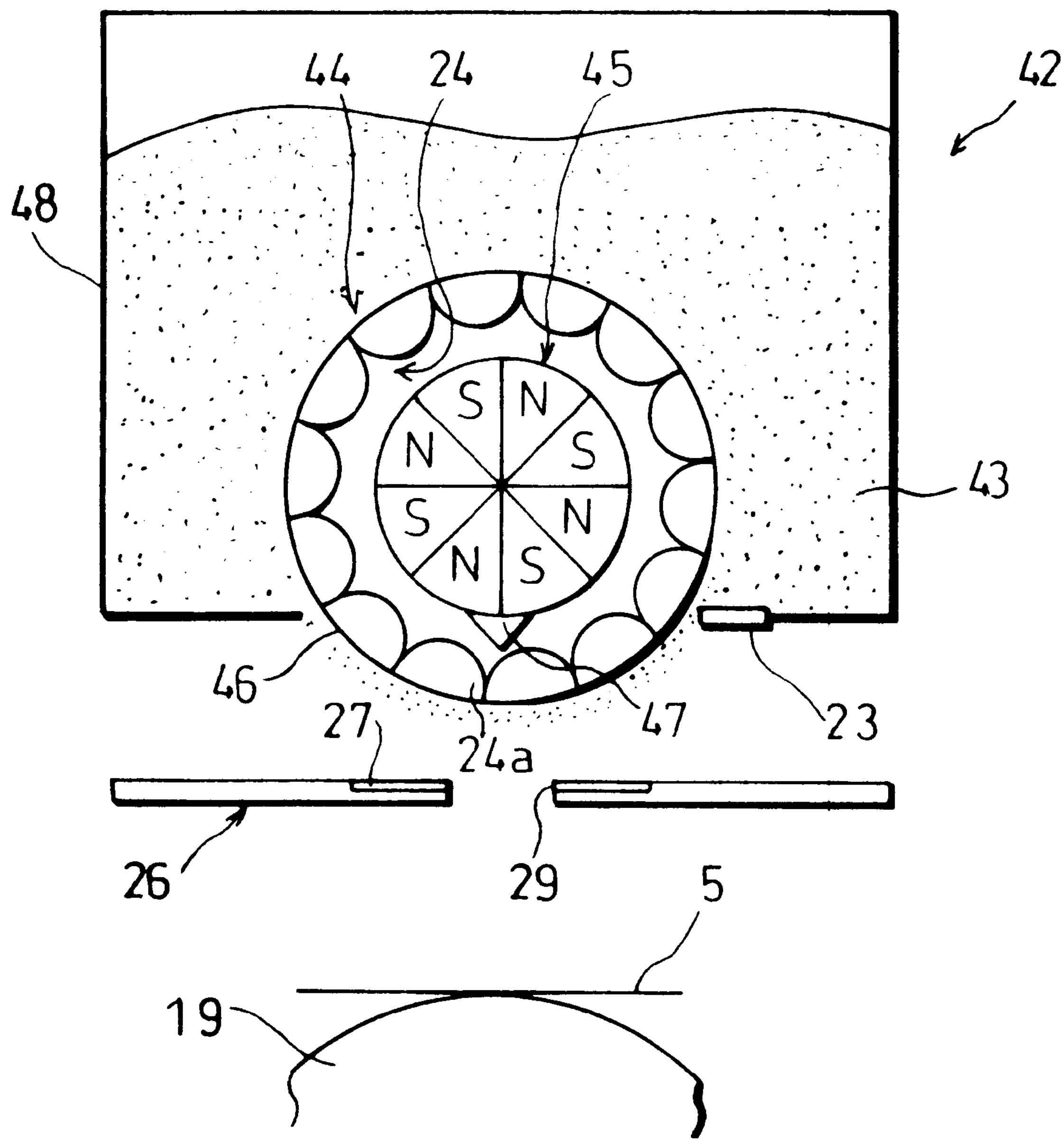
FIG. 8 is a cross-sectional view showing an even differently shaped convex-concave member.

In other words, if sharp edges of the protruding portions 24*a* and the protruding portion 47 come in contact with each other, both the protruding portions 24*a* and the protruding portion 47 easily wear and break. Therefore, as shown in FIG. 8, it is possible to restrain the wear and break of the protruding portions 24*a* and the protruding portion 47 to some degree by forming the protruding portions 24*a* in, for example, a semi-column shape. Note also that the protruding portion 47 formed in, for example, a semi-column shape (not shown) can produce the same effects.

Hardnesses and materials for the protruding portions 24*a* and the protruding portion 47 are the same as in the first embodiment, and description thereof is omitted in the present embodiment.

When the magnetic toner 43 in a toner storage box 48 is supplied onto the sleeve 46, the magnetic toner 43 is held on the sleeve 46 primarily by a magnetic force. As the sleeve 46 rotates, the layer thickness of the magnetic toner 43 on the sleeve 46 is restricted by a doctor blade 23 disposed on the upstream side of the toner projection area. The magnetic toner 43 is charged, for example, negatively by abrasion with the doctor blade 23. The charged toner 43 is transported to the toner projection area by the rotation of the sleeve 46.

Here, as the protruding portion 24*a* opposing the opposite electrode 19 comes into contact with the protruding portion 47 provided on the surface of the mag roller 45, the surface of the sleeve 46 vibrates. In this manner, the magnetic toner 43 receives a force in accordance with an acceleration caused by the vibration of the surface of the sleeve 46, thus being released from the adhesive forces such as the magnetic force.

As discussed so far, the image forming apparatus of the present embodiment forms a desired image on a sheet of paper 5 by controlling the projection of the magnetic toner 43 from the toner holding body 44 towards the opposite electrode 19 with a control electrode 26 to which a voltage varying depending on an image signal is applied, and is configured so that the toner holding body 44 is composed of the rotatable mag roller 45 and the rotatable sleeve 46, the protruding portion 47 is provided on the surface of the mag roller 45, and the protruding portions 24*a* are provided on the inner surface of the sleeve 46 so as to be hit by the protruding portion 47 in the toner projection area with rotation of the sleeve 46.

With the configuration, it is possible to efficiently vibrate the surface of the toner holding body 44 in the toner projection area, and to weaken the adhesive forces of the magnetic toner 43 to the sleeve 46. Therefore, even when the magnetic toner 43 is used, it is possible to project the magnetic toner 43 towards the opposite electrode 19 with a low voltage.

Generally, when the toner holding body 44 is composed of the mag roller 45 and the sleeve 46 as described above, the vibration of the mag roller 45 is transmitted to the surface of the sleeve 46 only with a loss. It is therefore impossible to efficiently vibrate the surface of the sleeve 46.

However, in the present embodiment, the surface of the sleeve 46 is vibrated efficiently to some degree by the contact and hit between the protruding portions 24*a* and the protruding portion 47 that are formed in a triangle-pole-like shape. Therefore, the adhesive forces of the magnetic toner 43 on the surface of the sleeve 46 are surely reduced. As a result, even if a low electric field is formed between the toner holding body 44 and the opposite electrode 19, the magnetic toner 43 can be projected towards the opposite electrode 19 through a plurality of gates 29 provided to the control electrode 26.

Consequently, since the magnetic toner 43 is projected with a low voltage, it is not necessary to use a piezoelectric vibrator, a cam roller, etc. that have been conventionally used to vibrate the surface of the toner holding body 44. As a result, it is neither necessary to provide a high voltage power source, a special circuit, etc. for driving them. Therefore, with the configuration, even when the magnetic toner 43 is used, it is possible to achieve weakening of the adhesive forces of the toner 43 with an apparatus of a simpler configuration than a conventional apparatus. Besides, since the configuration of the apparatus is simplified, it becomes possible to make attempts to reduce the size and costs of the apparatus.

Fourth Embodiment

Figure 9:
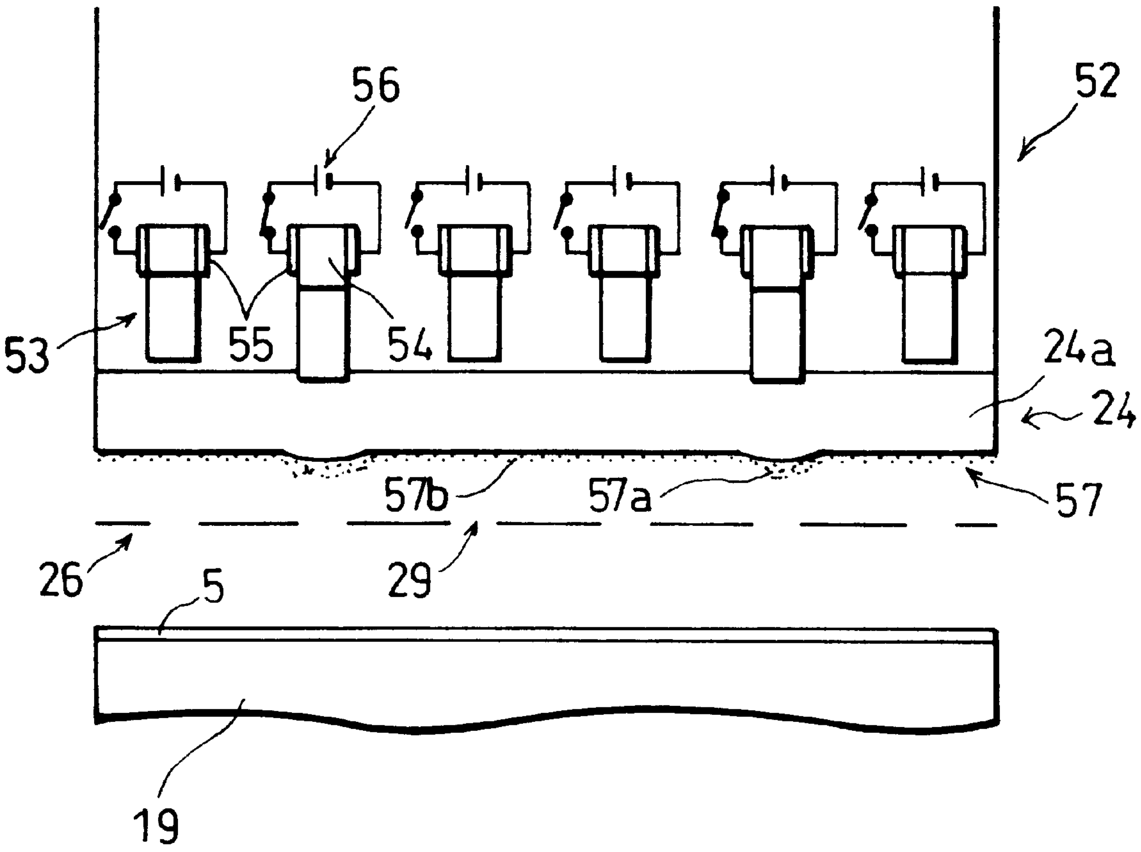
FIG. 9 is a cross-sectional view showing an example of a hitting member being divided vertically to the rotation axis of the toner holding body.

Referring to FIG. 9, the following description will discuss another embodiment in accordance with the present invention. The present embodiment will describe an example in which the hitting members or the first protruding portion adopted in the first, second and third embodiments are divided vertically to the rotation axis of the toner holding body. Note that in the present embodiment, a toner holding body 52 is adopted in the image forming apparatuses discussed in the first, second and third embodiments. Therefore, the following description will focus on an arrangement and functions of the toner holding body 52, and description of arrangements and functions that are common to the first, second, third and present embodiments are omitted. Besides, for convenience, members of the present embodiment that have the same function as members of the first, second and third embodiments are indicated by the same reference numerals and description thereof is omitted.

A convex-concave member 24 and hitting members 53 are provided inside the toner holding body 52. The hitting members 53 correspond to the hitting members 25 (see FIG. 1), 25' (see FIG. 5), 35 (see FIG. 6) and the protruding portion 47 (see FIG. 7) in the first, second and third embodiments divided vertically to the rotation axis of the toner holding body 52 so as to correspond to respective gates 29 of the control electrode 26. The hitting members 53 are disposed to hit the convex-concave member 24 on the inner surface of the toner holding body 52 in accordance with an image signal.

At least a part of the hitting member 53 is composed of a piezoelectric element 54 that can lengthen towards an opposite electrode 19 and shorten in the opposite direction. Electrodes 55 for applying a voltage to the piezoelectric element 54 are provided so as to sandwich the piezoelectric element 54. The electrodes 55 are connected to a drive circuit 56, and a voltage is arranged to be applied to the piezoelectric element 54 in accordance with a signal outputted from the drive circuit 56. In this manner, the piezoelectric element 54 lengthens towards the opposite electrode 19 and shortens in the opposite direction with application of a voltage to the piezoelectric element 54. As a result, the hitting member 53, at least a part of which is composed of the piezoelectric element 54, comes into contact with the convex-concave member 24. However, in the present embodiment, the hitting member 53 is configured so that the piezoelectric element 54 does not directly hit the protruding portion 24*a*.

A shape of the convex-concave member 24, and hardnesses and materials of the convex-concave member 24 and the hitting members 53 can be specified in the same manner as in the first embodiment, and therefore description thereof is omitted in the present embodiment.

Next, the following description will discuss an operation of projecting toner 57*a* corresponding to an image part of an output image by using the toner holding body 52 configured as above.

As the toner holding body 52 rotates and the surface thereof moves, the toner 57 supplied onto the toner holding body 52 is transported to a toner projection area and receives a projection electric field therein. A signal is applied by a drive circuit (not shown) to a control electrode 26 for controlling the projection of the toner 57 in accordance with image information. Simultaneously with that signal, inside the toner holding body 52, a signal is applied by the drive circuit 56 to the piezoelectric element 54 provided in the hitting member 53 in accordance with the image information. As a result, the piezoelectric element 54 lengthens towards the opposite electrode 19 and shortens in the opposite direction in accordance with the image information.

Here, when the toner 57*a* that corresponds to the image part of the output image and that is to be projected is projected, the drive circuit 56 applies a voltage to the piezoelectric element 54 of the hitting member 53 corresponding to the image part. The piezoelectric element 54 to which the voltage is applied lengthens towards the opposite electrode 19 and the hitting member 53 composed in part of the piezoelectric element 54 comes into contact with the protruding portion 24*a* of the convex-concave member 24. As a result, only a part of the surface of the toner holding body 52 corresponding to the image part vibrates, and only the adhesive forces of the toner 57*a* that is adhering to the surface of the toner holding body 52 and that is to be projected are weakened. The toner 57*a* can thereby be projected with a low projection voltage towards the opposite electrode 19. That is, only the toner 57*a* that is to be projected out of the toner 57 on the toner holding body 52 is released from the adhesive forces such as an image force, and becomes easier to be projected than toner 57*b* that is not to be projected.

By contrast, as to a non-image part of the output image, the voltage is not applied to the piezoelectric element 54 of the hitting member 53 corresponding to the non-image part. Therefore, the piezoelectric element 54 does not lengthen towards the opposite electrode 19 and the hitting member 53 composed in part of the piezoelectric element 54 does come into contact with the protruding portion 24*a* of the convex-concave member 24. As a result, a part of the surface of the toner holding body 52 corresponding to the non-image part does not vibrate, and the adhesive forces of the toner 57*b* that is adhering to the toner holding body 52 and that is not to be projected are maintained.

As discussed so far, the image forming apparatus of the present embodiment is configured so that the hitting members 53 are disposed so as to correspond to the control electrode 26 and to hit the protruding portion 24*a* on the inner surface of the toner holding body 52 in accordance with the image signal.

With the configuration, the toner 57 having passed through the control electrode 26 correspond to the image part of the output image. Since the hitting members 53 are disposed to hit the protruding portion 24*a* in accordance with the image signal, it is possible to control the adhesive forces of the toner 57 depending on the image and non-image parts.

In other words, for example, as to the image part, the hitting member 53 hits the protruding portion 24*a* and vibrates the surface of the toner holding body 52 corresponding to the image part, thereby weakening the adhesive forces of the toner 57*a* corresponding to the image part. On the other hand, for example, as to the non-image part, the hitting member 53 neither hits the protruding portion 24*a* nor vibrates the surface of the toner holding body 52 corresponding to the non-image part, thereby maintaining, not weakening, the adhesive forces of the toner 57*b* corresponding to the non-image part.

Therefore, with the configuration, the contrast between the image and non-image parts can be greater, since only the toner 57*a* that corresponds to the image part and that is to be projected can reduce the adhesive forces thereof with the image signal. Moreover, a so-called overlap (the toner 57*b* adhering to the non-image part) can be prevented in the non-image part, since the adhesive forces of the toner 57*b* that is not to be projected to the toner holding body 52 are not weakened. Consequently, it is possible to obtain a high quality output image.

In the present embodiment, at least a part of the hitting member 53 is composed of the piezoelectric element 54, and the other part of the hitting member 53 that is not composed of the piezoelectric element 54 hits the protruding portion 24*a* with the application of the voltage to the piezoelectric element 54. In this case, since it is possible to control the lengthening and shortening of the piezoelectric element 54 at a high speed and with high precision, it is possible to control the vibration of the surface of the toner holding body 52 and the adhesive forces of the toner 57 at a high speed and with high precision. Therefore, with the configuration, it is possible to output images at a high speed.

Note that in the present embodiment, the piezoelectric element 54 composes only a part of the hitting member 53 and thereby configured not to directly come into contact with the convex-concave member 24 when the voltage is applied. But, the whole hitting member 53 may be composed of a piezoelectric element 54 so that the piezoelectric element 54 directly comes into contact with the convex-concave member 24 when the voltage is applied.

However, the piezoelectric element 54 used as a part of the hitting member 53 is generally more expensive than materials for the other part of the hitting member 53 that is not composed of the piezoelectric element 54. Therefore, if the whole hitting member 53 is composed of a piezoelectric element 54, and when the piezoelectric element 54 wears or breaks, it is very costly to replace the worn or broken piezoelectric element 54. Besides, the piezoelectric element 54 is sandwiched by the electrodes 55, and this structure makes it difficult to perform maintenance of the piezoelectric element 54.

For these reasons, the convex-concave member 24 preferably comes into contact with a part of the hitting member 53 that does not include the piezoelectric element 54. This prevents the piezoelectric element 54 from directly hitting the convex-concave member 24 and wearing. It is therefore not necessary to replace the piezoelectric element 54.

Consequently, the configuration can prevent the relatively expensive piezoelectric element 54 from wearing and breaking, and does not require replacement of the piezoelectric element 54 due to wearing or breaking. As a result, it is possible to surely and greatly reduce the replacement cost of the piezoelectric element 54 and the running cost of the apparatus (various expenses for running the apparatus for a long period of time, including replacement of consumable parts).

Fifth Embodiment

Figure 10:
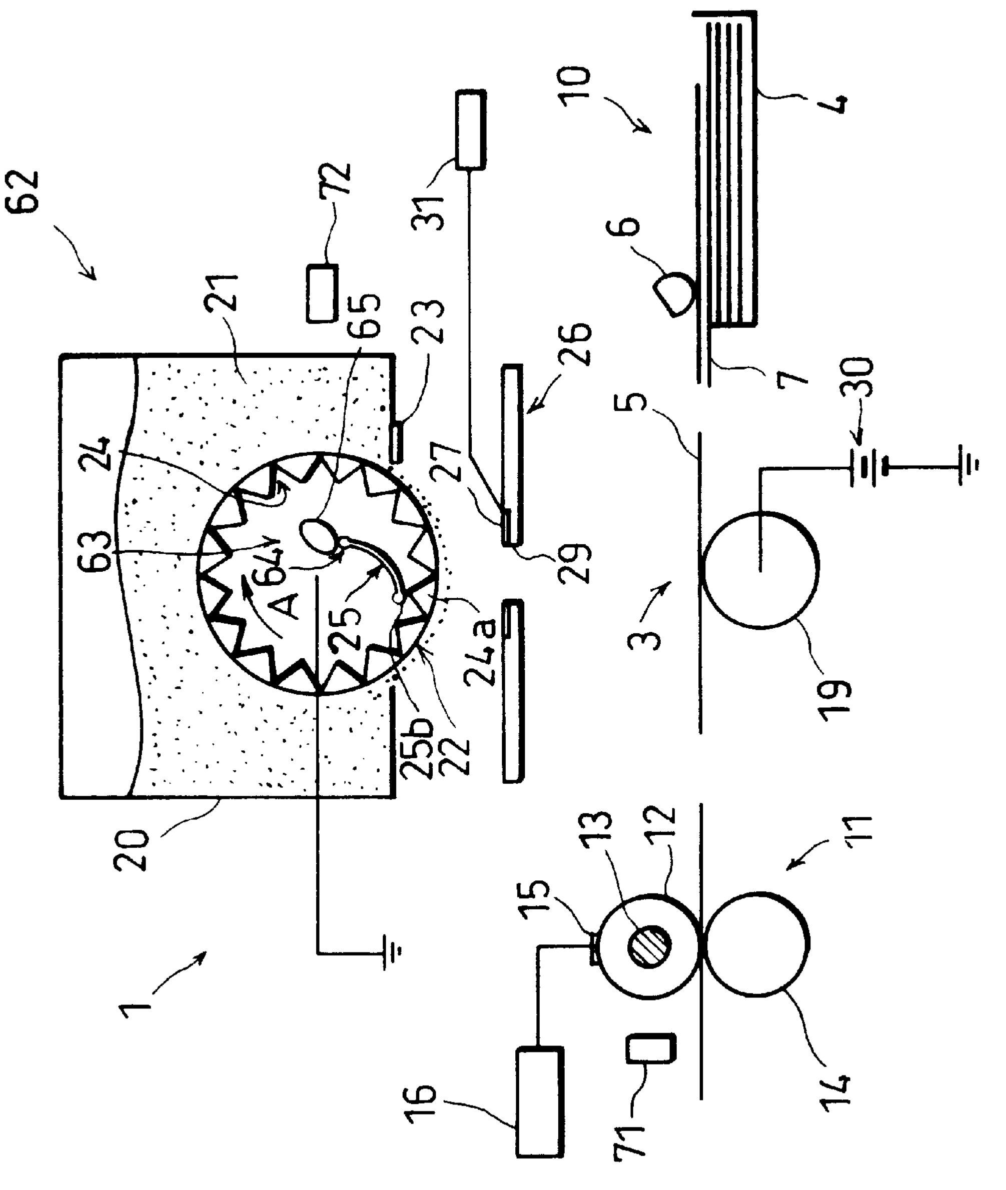
FIG. 10 is a cross-sectional view schematically showing a configuration of another image forming apparatus.
Figure 11:
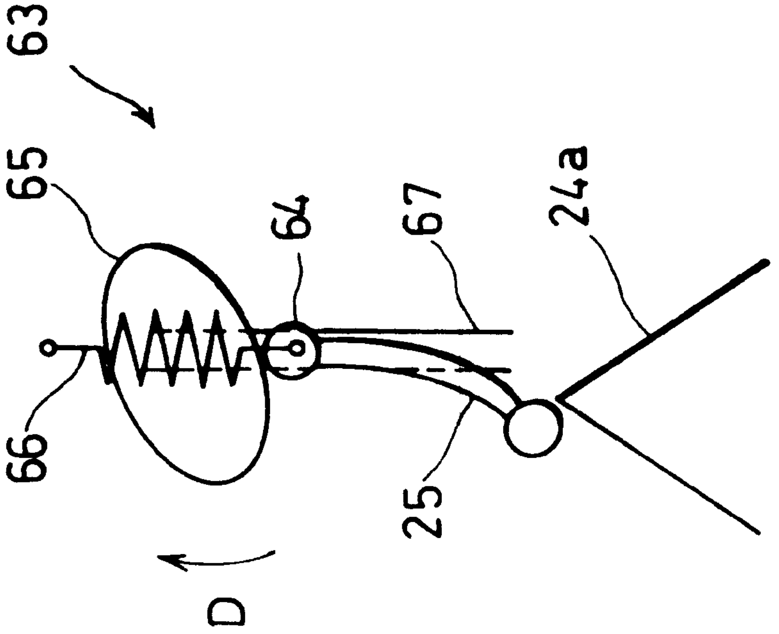
FIG. 11(*a*) is an explanatory drawing showing a hitting member shifted closer to a protruding portion by rotation of a cam roller, and FIG. 11(*b*) is an explanatory drawing showing the hitting member shifted further from the protruding portion by rotation of the cam roller.
Figure 11:
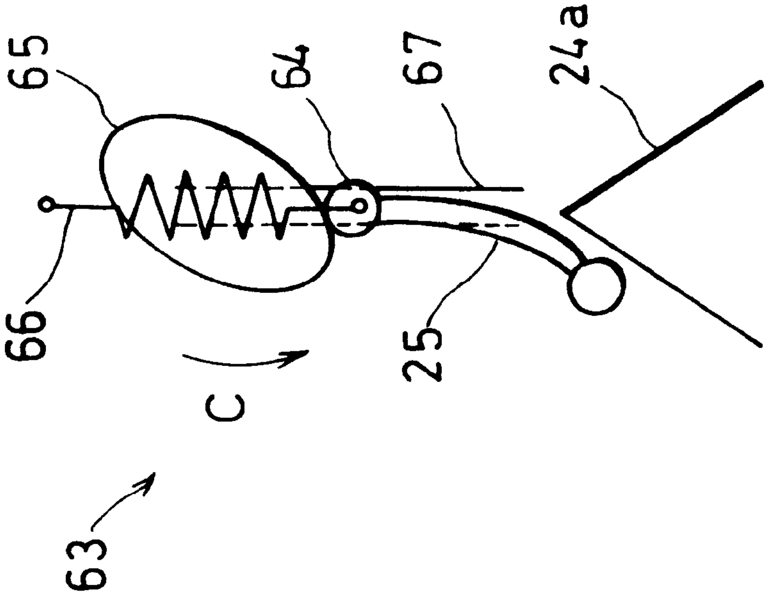
Figure 12:
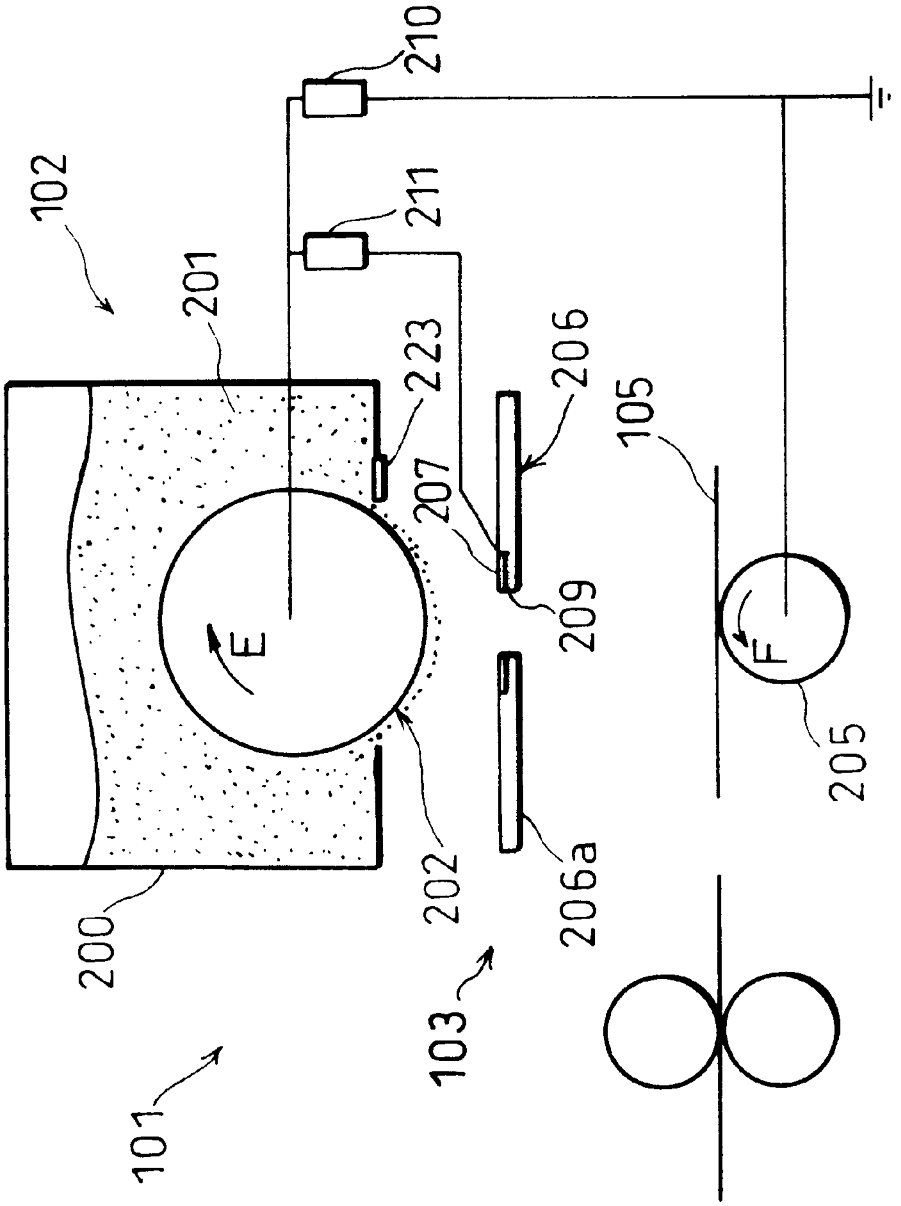
FIG. 12 is a cross-sectional view schematically showing a configuration of a conventional image forming apparatus.
Figure 13:
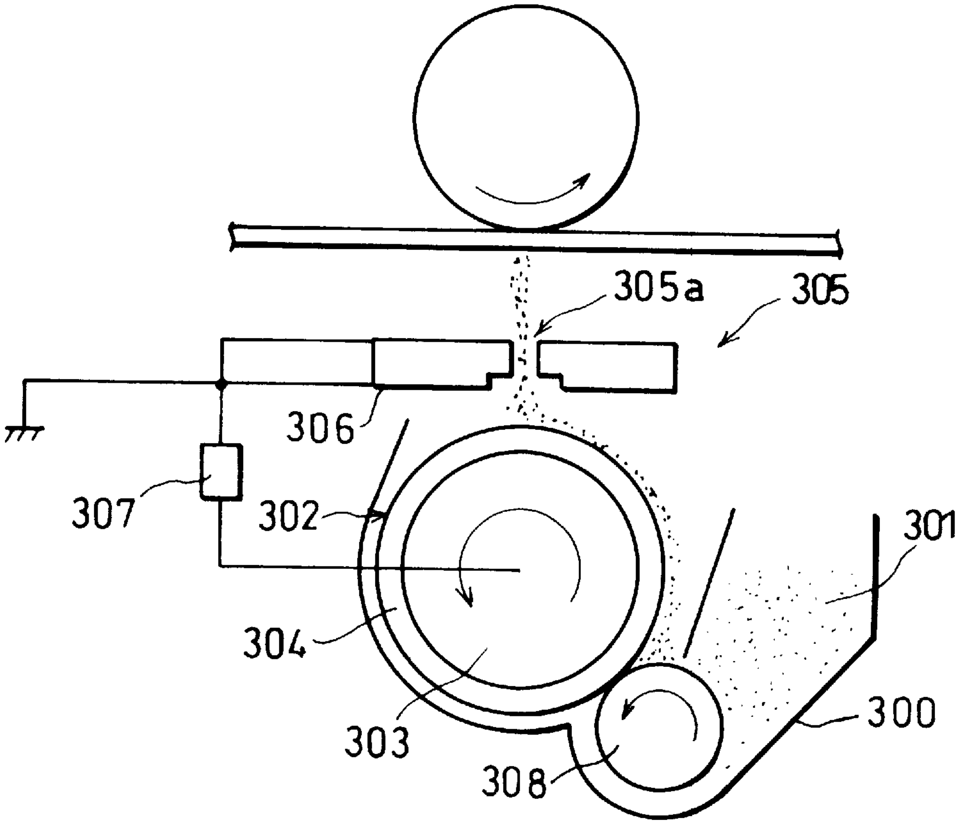
FIG. 13 is a cross-sectional view schematically showing a configuration of another conventional image forming apparatus.
Figure 14:
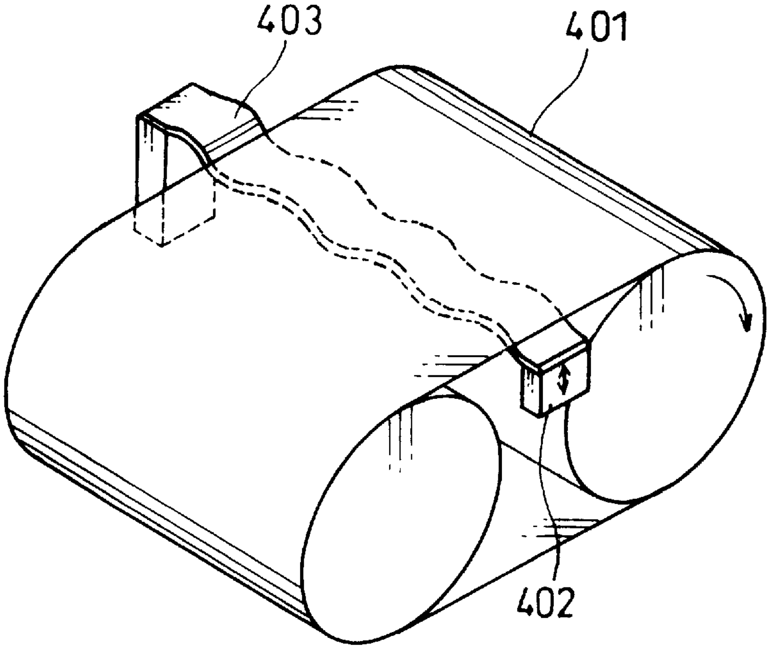
FIG. 14 is a perspective view showing a configuration of a toner holding body incorporated in even another conventional image forming apparatus.

Referring to FIGS. 10, 11(*a*) and 11(*b*), the following description will discuss another embodiment in accordance with the present invention. The present embodiment will describe an example in which a hitting amount control mechanism (hitting amount control means) 63 is provided for controlling the hitting amount between a convex-concave member 24 and a hitting member 25 inside the toner holding bodies 22 of the image forming apparatuses discussed in the first, second and fourth embodiments. For convenience, members of the present embodiment that have the same function as members of the first, second and fourth embodiments are indicated by the same reference numerals and description thereof is omitted.

An image forming apparatus of the present embodiment is, as shown in FIG. 10, composed of a toner holding body 22, an opposite electrode 19 disposed to oppose the toner holding body 22, a control electrode 26, a power source 30, and a control power source section 31. Inside the toner holding body 22 are provided the convex-concave member 24, the hitting member 25 and the hitting amount control mechanism 63 for controlling the hitting amount between a convex-concave member 24 and a hitting member 25. The control electrode 26 has a plurality of gates 29, disposed between the toner holding body 22 and the opposite electrode 19, through which toner 21 passes. The power source 30 applies a predetermined potential to the opposite electrode 19 so as to create a predetermined potential difference across the toner holding body 22 and the opposite electrode 19. The control power source section 31 controls the passing of the toner 21 through the gates 29 by varying the potential applied to the control electrode 26.

The hitting amount control mechanism 63 is, as shown in FIGS. 11(*a*) and 11(*b*), composed of a support portion 64 for supporting the hitting member 25, a cam roller 65 for coming in contact with the support portion 64, a spring 66 for pushing the support portion 64 to the cam roller 65, and a guide 67 for guiding the hitting member 25 so that the hitting member 25 shifts in the same direction as the spring 66 lengthens and shortens. The cam roller 65 receives a signal from a control circuit (not shown) and is arranged to be rotatable in the directions indicated by the arrow C in FIG. 11(*a*) and by the arrow D in FIG. 11(*b*).

That is, the support portion 64 is pushed to the cam roller 65 by the spring 66. Therefore the cam roller 65, as it rotates, shifts the support portion 64 and the hitting member 25. This varies the hitting amount of the hitting member 25 to the convex-concave member 24.

With the configuration, as the toner holding body 22 rotates in the direction indicated by the arrow A in FIG. 10, the toner 21 in a toner storage box 20 is supplied onto the toner holding body 22 and transported to a toner projection area. Here, the surface of the toner holding body 22 in the toner projection area vibrates, because an end portion 25*b* of the hitting member 25 hits a protruding portion 24*a* of the convex-concave member 24. Then, the toner 21 on the toner holding body 22 is affected by an acceleration caused by the vibration and released from the adhesive forces such as an image force, and receives an electric field in accordance with an image signal. As a result, the toner 21 corresponding to the image part passes through the gates 29 provided to the control electrode 26, and adheres to a sheet of paper 5 transported onto the opposite electrode 19 according to image information. Thereafter, the sheet of paper 5 is transported to a fixing section 11 to be heated and pressurized therein. A toner image on the sheet of paper 5 is thus fixed as a permanent image.

Here, since the adhesive forces of the toner 21 to the toner holding body 22 varies depending on an vibration amount (amplitude) of the surface of the toner holding body 22, it is possible to vary image density by controlling the vibration amount. That is, a necessary toner projection amount for a desired image density can be ensured by varying the hitting amount between the convex-concave member 24 and the hitting member 25 in the toner holding body 22 with the hitting amount control mechanism 63. The image density can be varied in this manner.

More specifically, when the image density is to be increased, as shown in FIG. 11(*a*), the cam roller 65 is rotated in the direction indicated by the arrow C. The hitting member 25 then shifts towards the protruding portion 24*a* along the guide 67. This increases the hitting amount of the hitting member 25 to the protruding portion 24*a* of the convex-concave member 24, and also increases the vibration amount on the surface of the toner holding body 22. As a result, the toner projection amount is increased. The image density can be increased in this manner.

By contrast, when the image density is to be decreased, as shown in FIG. 11(*b*), the cam roller 65 is rotated in the direction indicated by the arrow D. The hitting member 25 then shifts away from the protruding portion 24*a* along the guide 67. This decreases the hitting amount of the hitting member 25 to the protruding portion 24*a* of the convex-concave member 24, and also decreases the vibration amount on the surface of the toner holding body 22. As a result, the toner projection amount is decreased. The image density can be decreased in this manner. The image forming apparatus in accordance with the present invention can control the image density of an output image in this manner.

As discussed so far, the image forming apparatus of the present embodiment is configured to include the hitting amount control mechanism 63 for controlling the hitting amount between the protruding portion 24*a* and the hitting member 25.

With the configuration, for example, if the hitting amount between the protruding portion 24*a* and the hitting member 25 is increased from an ordinary amount with the hitting amount control mechanism 63, the vibration amount on the surface of the toner holding body 22 is also increased from the ordinary amount. This considerably decreases the adhesive forces of the toner 21 to the toner holding body 22 and makes it easier to project the toner 21 in a larger amount even under ordinary projection conditions. Consequently, the density of the output image is increased.

By contrast, if the hitting amount is decreased with the hitting amount control mechanism 63, the vibration amount of the surface of the toner holding body 22 is also decreased accordingly. This restrains the weakening of the adhesive forces of the toner 21 to the toner holding body 22 and makes it difficult to project the toner 21 even under ordinary projection conditions. Consequently, the density of the output image is decreased.

For these reasons, with the configuration, it is possible to control the density of the output image with a simple configuration almost without changing the projection conditions. Besides, since it is possible to control the density of the output image with a simple configuration, it is possible to make attempts to make a smaller and cheaper apparatus than a typical apparatus provided with image density control means.

Moreover, the sheet of paper 5 on which the toner image is formed is ejected after passing through the fixing section 11. An alternative configuration here is to provide, on the paper ejection side of the fixing section 11, image density detecting means 71 for detecting the density of the image formed on the sheet of paper 5, so that the hitting amount between the convex-concave member 24 and the hitting member 25 in the toner holding body 22 is automatically controlled according to results detected by the image density detecting means 71.

Generally speaking, if the image forming apparatus is used over a long period of time, the toner amount and the charging amount may vary, and cause the image density of the output image to vary. Therefore, by providing the image density detecting means 71 for detecting the density of the output image, it becomes possible to always monitor and feedback the image density of the output image and then calculate a necessary vibration amount (amplitude) of the surface of the toner holding body 22 for a next image formation. That is, the hitting amount between the convex-concave member 24 and the hitting member 25 in the toner holding body 22 is automatically controlled according to results detected by the image density detecting means 71. Consequently, it is always possible to form high quality images in a stable manner by providing the image density detecting means 71 to the image forming apparatus in accordance with the present invention.

Moreover, environmental state detecting means for detecting an environmental state for operation (e.g., a humidity detecting section 72 for detecting humidity) may be provided either inside or outside the image forming apparatus in accordance with the present invention, so that the hitting amount control mechanism 63 automatically controls the hitting amount between the convex-concave member 24 and the hitting member 25 in the toner holding body 22 according to results detected by the environmental state detecting means.

Because if an environmental state for operation (especially, humidity in the operation environment) changes, a liquid bridge force between the toner 21 and the toner holding body 22 varies greatly. As a result, the projection of the toner 21 becomes unstable, and then the density of the output image becomes unstable.

Therefore, if the image forming apparatus in accordance with the present invention is configured so as to include the humidity detecting section 72 for detecting the humidity around the apparatus, and so as to automatically control the hitting amount with the hitting amount control mechanism 63 according to the results detected by the humidity detecting section 72, even when an environmental condition such as the humidity around the apparatus changes, it is possible to prevent the image density of the output image from varying, and also to form images in a stable manner while ensuring a predetermined high quality image density.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An image forming apparatus, comprising:

a holding body for holding image visualizing particles;

an opposite electrode disposed so as to oppose the holding body;

first potential providing means for providing a first potential to the opposite electrode and forming an electric field to project the image visualizing particles between the holding body and the opposite electrode towards the opposite electrodes;

a control electrode disposed between the holding body and the opposite electrode; and second potential providing means for providing a second potential to the control electrode varying the electric field in accordance with an image signal so that the projection of the image visualizing particles from the holding body towards the opposite electrode is controlled by the control electrode, said image forming apparatus forming an image on a recording medium disposed between the holding body and the opposite electrode by projecting the image visualizing particles from the holding body towards the opposite electrode and adhering the image visualizing particles onto the recording medium, wherein the holding body includes a plurality of protruding portions formed on an inner surface thereof, and also includes inside thereof a hitting member for hitting the protruding portions with rotation of the holding body.

2. The image forming apparatus as defined in claim 1, wherein the hitting member is disposed so as to hit the protruding portion opposing the opposite electrode.

3. The image forming apparatus as defined in claim 1, wherein the hitting member is composed of at least two hitting members provided so as to be replaceable.

4. The image forming apparatus as defined in claim 1, further comprising cleaning means, disposed on a downstream side of the control electrode with respect to a rotation direction of the holding body, for removing the image visualizing particles on the holding body, wherein the hitting member is composed of a first hitting member and a second hitting member, the first hitting member being disposed so as to hit the protruding portion located opposite to the opposite electrode, and the second hitting member being disposed so as to hit the protruding portion located opposite to the cleaning means.

5. The image forming apparatus as defined in claim 1, wherein, the protruding portion is formed so as to have a polygonal pole shape.

6. The image forming apparatus as defined in claim 1, wherein the protruding portion is formed so as to have a semi-column shape.

7. The image forming apparatus as defined in claim 1, wherein the hitting member is divided so as to correspond to the control electrode and disposed so as to hit the protruding portion on the inner side of the holding body in accordance with the image signal.

8. The image forming apparatus as defined in claim 1, further comprising hitting amount control means for controlling a hitting amount between the protruding portion located opposite to the opposite electrode and the hitting member.

9. The image forming apparatus as defined in claim 1, wherein the hitting member has a fixed end and a free end, the fixed end being fixed on the upstream side of the free end with respect to a rotation direction of the holding body.

10. The image forming apparatus as defined in claim 1, wherein the protruding portions are specified to be harder than the hitting member so that the hitting member is easier to wear than the protruding portions due to contact between the hitting member and the protruding portions.

11. The image forming apparatus as defined in claim 1, wherein the hitting member is specified to be harder than the protruding portions so that the protruding portions are easier to wear than the hitting member due to contact between the hitting member and the protruding portions.

12. The image forming apparatus as defined in claim 1, wherein the hitting member is made of a nylon, and the protruding portions are made of a stainless steel.

13. The image forming apparatus as defined in claim 1, wherein the protruding portions are made of a nylon, and the hitting member is made of a stainless steel.

14. The image forming apparatus as defined in claim 4, wherein the first hitting member has a fixed end and a free end, the fixed end being fixed on the upstream side of the free end with respect to a rotation direction of the holding body.

15. The image forming apparatus as defined in claim 4, wherein the second hitting member has a fixed end and a free end, the fixed end being fixed on the upstream side of the free end with respect to a rotation direction of the holding body.

16. The image forming apparatus as defined in claim 4, wherein the protruding portions are specified to be harder that the first hitting member so that the hitting member is easier to wear than the protruding portions due to contact between the first hitting member and the protruding portions.

17. The image forming apparatus as defined in claim 4, wherein the first hitting member is specified to be harder than the protruding portions so that the protruding portions are easier to wear than the first hitting member due to contact between the first hitting member and the protruding portions.

18. The image forming apparatus as defined in claim 4, wherein the protruding portions are specified to be harder that the second hitting member so that the second hitting member is easier to wear than the protruding portions due to contact between the first hitting member and the protruding portions.

19. The image forming apparatus as defined in claim 4, wherein the first hitting member is specified to be harder than the protruding portions so that the protruding portions are easier to wear than the second hitting member due to contact between the second hitting member and the protruding portions.

20. The image forming apparatus as defined in claim 4, wherein the first and second hitting members are made of a nylon, and the protruding portions are made of a stainless steel.

21. The image forming apparatus as defined in claim 4, wherein the protruding portions are made of a nylon, and the first and second hitting members are made of a stainless steel.

22. The image forming apparatus as defined in claim 8, further comprising image density detecting means for detecting a density of the image formed on the recording medium, wherein the hitting amount control means controls the hitting amount according to a result detected by the image density detecting means.

* * * * *